US011343265B2

(12) United States Patent
Lotem et al.

(10) Patent No.: US 11,343,265 B2
(45) Date of Patent: *May 24, 2022

(54) SYSTEM AND METHODS FOR MALWARE DETECTION USING LOG ANALYTICS FOR CHANNELS AND SUPER CHANNELS

(71) Applicant: Seculert Ltd., Petah Tikva (IL)

(72) Inventors: Amnon Lotem, Ramot Hashavim (IL); Doron Peri, Tel Aviv (IL); Aviv Raff, Kiryat Ono (IL)

(73) Assignee: Seculert Ltd., Petah Tikva (IL)

( * ) Notice: Subject to any disclaimer, the term of this patent is extended or adjusted under 35 U.S.C. 154(b) by 186 days.

This patent is subject to a terminal disclaimer.

(21) Appl. No.: 15/017,636

(22) Filed: Feb. 7, 2016

(65) Prior Publication Data

US 2016/0156655 A1 Jun. 2, 2016

Related U.S. Application Data

(63) Continuation-in-part of application No. 14/738,959, filed on Jun. 15, 2015, which is a continuation-in-part of application No. 13/810,450, filed as application No. PCT/IB2011/053253 on Jul. 21, 2011, now Pat. No. 9,270,690.

(60) Provisional application No. 62/266,892, filed on Dec. 14, 2015, provisional application No. 61/482,223, filed on May 4, 2011, provisional application No. 61/411,006, filed on Nov. 8, 2010, provisional application No. 61/366,168, filed on Jul. 21, 2010.

(51) Int. Cl.
*H04L 29/06* (2006.01)
*H04W 12/67* (2021.01)

(52) U.S. Cl.
CPC ........ *H04L 63/1425* (2013.01); *H04L 63/145* (2013.01); *H04L 63/1416* (2013.01); *H04L 63/1433* (2013.01); *H04W 12/67* (2021.01)

(58) Field of Classification Search
CPC .............. H04L 63/145; H04L 63/1425; H04L 63/1416; H04L 63/1433
USPC ........................................................ 726/23
See application file for complete search history.

(56) References Cited

U.S. PATENT DOCUMENTS

| | | |
|---|---|---|
| 7,904,958 B2 | 3/2011 | Lee |
| 8,156,541 B1 | 4/2012 | Thomas et al. |
| 8,510,840 B2 | 8/2013 | Futamura |
| 8,769,684 B2 | 7/2014 | Stolfo et al. |
| 8,793,787 B2 | 7/2014 | Ismael et al. |
| 9,009,829 B2 | 4/2015 | Stolfo et al. |
| 9,043,894 B1 | 5/2015 | Dennison et al. |
| 9,270,563 B1 | 2/2016 | Brouillette et al. |
| 9,350,601 B2 | 5/2016 | Jain |

(Continued)

*Primary Examiner* — Jeffrey C Pwu
*Assistant Examiner* — Nega Woldemariam
(74) *Attorney, Agent, or Firm* — M&B IP Analysts, LLC

(57) ABSTRACT

Log based analysis systems and methods for protecting computers and networks from malicious communications and malware attacks by analyzing log data obtained from client networks having network entities representing business units or customers. The system may further comprise a plurality of client asset machines, each operable to execute a security product associated with a security product vendor and log associated information of the network entities into at least one log file. The log files may be uploaded onto a log-analytics detection platform for analysis using learning algorithms operable to generate a risk factor attribute for at least one entity.

19 Claims, 13 Drawing Sheets

(56) References Cited

U.S. PATENT DOCUMENTS

| | | |
|---|---|---|
| 9,571,640 B1 | 2/2017 | Chen et al. |
| 2008/0080518 A1 | 4/2008 | Hoeflin et al. |
| 2008/0082380 A1* | 4/2008 | Stephenson ............ G06Q 10/06 |
| | | 726/25 |
| 2008/0307526 A1 | 12/2008 | Chung et al. |
| 2009/0044024 A1* | 2/2009 | Oberheide ............ G06F 21/562 |
| | | 713/188 |
| 2009/0249481 A1 | 10/2009 | Long et al. |
| 2009/0254989 A1 | 10/2009 | Achan et al. |
| 2010/0037314 A1 | 2/2010 | Perdisci et al. |
| 2010/0050249 A1 | 2/2010 | Newman |
| 2010/0115621 A1 | 5/2010 | Staniford et al. |
| 2010/0162350 A1 | 6/2010 | Jeong et al. |
| 2011/0035390 A1* | 2/2011 | Whitehouse ........ H04L 63/1425 |
| | | 707/755 |
| 2011/0035781 A1* | 2/2011 | Moghe ................ G06F 21/554 |
| | | 726/1 |
| 2011/0126136 A1 | 5/2011 | Abella et al. |
| 2012/0203900 A1 | 8/2012 | Wang et al. |
| 2012/0204264 A1 | 8/2012 | Jiang |
| 2013/0091570 A1 | 4/2013 | McCorkendale et al. |
| 2013/0144879 A1 | 6/2013 | Kuehnel et al. |
| 2013/0254880 A1 | 9/2013 | Alperovitch et al. |
| 2014/0007238 A1 | 1/2014 | Magee et al. |
| 2014/0051432 A1 | 2/2014 | Gupta et al. |
| 2014/0165188 A1 | 6/2014 | Giblin et al. |
| 2014/0245436 A1 | 8/2014 | Dagon et al. |
| 2015/0026594 A1 | 1/2015 | Dave et al. |
| 2015/0106889 A1 | 4/2015 | Sharabani et al. |
| 2015/0244732 A1 | 8/2015 | Golshan et al. |
| 2015/0326588 A1 | 11/2015 | Vissamsetty et al. |
| 2015/0326592 A1 | 11/2015 | Vissamsetty et al. |
| 2016/0205115 A1 | 7/2016 | Kulkarni et al. |
| 2016/0269436 A1 | 9/2016 | Danielson et al. |

* cited by examiner

SYSTEM AND METHODS FOR MALWARE DETECTION USING LOG ANALYTICS FOR CHANNELS AND SUPER CHANNELS

CROSS-REFERENCE TO RELATED APPLICATIONS

This application is a Continuation-In-Part of U.S. patent application Ser. No. 14/738,959, filed Jun. 15, 2015, which is a Continuation-In-Part of U.S. patent application Ser. No. 13/810,450, filed Jan. 16, 2013, which is a 371 of International Patent Application No. PCT/IB2011/053253, filed Jul. 21, 2011, which claims the benefit of priority from U.S. Provisional Patent Application No. 61/366,168, filed Jul. 21, 2010, U.S. Provisional Patent Application No. 61/411,006, filed Nov. 8, 2010, and U.S. Provisional Patent Application No. 61/482,223, filed May 4, 2011. This application further claims the benefit of priority from U.S. Provisional Patent Application No. 62/266,892 filed Dec. 14, 2015. All of the above-identified applications are hereby incorporated by reference in their entirety.

FIELD OF THE INVENTION

The present invention relates to internet security and log analytics. In particular the invention relates to a system of protecting computers and networks from malware attacks using methods for identifying malicious communications by analyzing log data of outbound communication associated with channels and super-channels log data analysis.

BACKGROUND OF THE INVENTION

Internet security is challenging, and the types of threats computers are exposed to are rapidly increasing. Software infecting computers is commonly known as malware, referring to a variety of forms of hostile or intrusive software.

Accordingly, computers infected with malware may expose various indicators such as strange computer behavior; slow computer or web browser speeds; increased CPU usage; freezing or crashing; modified or deleted files; problems connecting to networks; appearance of strange files, programs, or desktop icons; programs running, turning off, or reconfiguring themselves (malware will often reconfigure or turn off antivirus and firewall programs); emails/messages being sent automatically without user's knowledge and more.

Threat identification techniques may include traditional signature and sandbox based approaches and Security Information and Event Management (STEM) solutions. However, sophisticated adversaries are succeeding in hiding attacks from traditional approaches and today's SIEMs function more as logging systems used for forensics rather than for attack detection. Using elaborate techniques to avoid detection, the difference between an attack and a legitimate application may be as subtle as a few communication attempts to external servers. Detecting these attacks requires a different technique.

The drawback of prior art malware detection systems is the difficulty in analyzing solid information representing the normal practice of business units or customers combined with the need to apply continuous learning processes to enable discovery of hidden patterns of potential attackers. Systems are required to be capable of providing extensive coverage of many malware family types, regardless of their characteristics and methods of infection with new patterns emerging constantly.

The need remains therefore for a system providing accurate, reliable and automated malware detection system while providing unique visibility to analyze malware patterns, identifying malicious communications based upon a plurality of log files data associated with a plurality of business units. The current disclosure addresses this need.

SUMMARY OF THE INVENTION

Accordingly, it is one aspect of the current disclosure to present a log-analytic system for identifying outbound communications to detect at least one security threat in at least one client network, the system comprising:

at least one log-analytic detection platform operable to receive a plurality of log files from the at least one client network via a communication network; at least one asset associated with the at least one client network and operable to communicate with at least one host via the communication network; and at least one network entity associated with the at least one client network operable to enable outbound communication and further log assessment attributes associated with at least one channel into at least one log file of the plurality of log files; wherein the at least one channel connects the at least one asset with at least one host and the log-analytic detection system is operable to identify the at least one channel and generate a risk factor for at least one entity associated with entities of the at least one channel.

Variously, the at least one entity associated with entities of at least one channel are selected from a group consisting of: a channel, an asset, a host and combinations thereof. Further, the risk factor determines the at least one entity as at least one of a group consisting of: malicious, non-malicious, threatening, non-threatening, legitimate and suspicious.

As appropriate, wherein the at least one log-analytic detection platform is operable to collect data pertaining to the at least one client network, to normalize the data and to store the normalized data into at least one entity record of a data repository. Additionally, the at least one log-analytic detection platform is further operable to create an output incidents report comprising data pertaining to the risk factor associated with the at least one entity. Accordingly, the output incidents report may be configured to be transmitted via the communication network to the at least one client network. Where appropriate, in some embodiments, the at least one log-analytic detection platform is further operable to generate an alert associated with a detectable security incident associated with one of the set of network client assets, the alert may be configured to be transmitted via the communication network.

According to another aspect of the disclosure, a method is taught for detecting security threats associated with at least one client network, the method for use in a system, the system comprising: at least one network entity associated with the at least one client network and operable to enable outbound communication via a communication network, at least one asset operable to communicate with one of a plurality of hosts via the communication network; and at least one log-analytic detection platform operable to analyze a plurality of log files associated with a plurality of channels, each of the plurality of channels connecting an asset with a host, and further operable to determine a risk factor for at least one entity, and as appropriate, each of the plurality of channels being characterized by a channel identification pair comprising the asset and the host.

Accordingly, the method for operating the at least one log-analytics detection platform in an improved manner, the method comprising: obtaining, via the communication network, the plurality of log files from the at least one client network, each of the plurality of log files comprising at least one log record associated with at least one channel; extracting a channel feature set for each of the plurality of channels from the plurality of log files, the channel feature set comprises data pertaining to at least one associated entity; aggregating the channel associated features for each of the plurality of channels into at least one data repository; and generating the risk factor for the least one entity associated with entities of the plurality of channels, the risk factor characterized by an entity score.

Variously, the at least one entity is selected from a group of entities consisting of: a channel, an asset, a host and combinations thereof.

Optionally, the step of obtaining further comprises: normalizing each of the plurality of log files by mapping fields associated with the at least one log record from a third-party format into a standard format.

As appropriate, the step of extracting, comprises: matching at least one log record associated with at least one of the plurality of channels; grouping the at least one log record into a group of channel associated records for at least one of the plurality of channels, each group of said set is associated with one matched channel; extracting the channel feature set from the group of channel associated records associated with each of the plurality of channels and identified by the channel identification pair, wherein the channel feature set being characterized by at least one of: data pertaining to communication behavior, data pertaining to host domain and data pertaining to host IP; and extracting, for each channel, asset associated features and host associated features and integrating into the channel feature set.

As appropriate, the step of aggregating, comprises: retrieving, from the at least one data repository, a stored channel and an associated stored channel feature set identified by the channel identification pair; joining the channel feature set with the stored channel feature set matched by the entity identification pair; computing features for computing features entity associated with the stored channel; and storing the joined channel feature set into the at least one data repository.

As appropriate, the step of computing further comprises: grouping a set of channels matched by the associated host; and computing the features of the associated host by joining the feature associated with each channel which is associated with the host.

Variously, wherein the step of joining uses a mathematical function selected from a group consisting of average, weighted average, list concatenation, minimum, maximum or combinations thereof.

As appropriate, wherein the step of generating, comprises: using an entity scoring model, the entity scoring model is operable to provide the entity score for the at least one entity; classifying the at least one entity to determine the risk factor according to the entity score; and storing pertaining data of the risk factor into the at least one data repository; wherein the entity score expresses the likelihood that the at least one entity is associated with a command and control (C&C) host communication.

Variously, wherein the entity score is selected from a group consisting of: a Boolean value, a numerical value, a unit interval, a value within a range, a percentage value, a decimal value, a numerical ratio value, a key word, a descriptive text, a tagged label and combinations thereof.

Variously, the risk factor is selected from a group consisting of: malicious, non-malicious, threatening, non-threatening, legitimate, suspicious, a descriptive text, a value within a range or combinations thereof.

As appropriate, wherein the at least one log-analytic detection platform is operable to collect a plurality of classified entities and execute a supervised machine learning algorithm to determine said entity scoring model, and variously, wherein the plurality of classified entities are selected from a group consisting of a channel, an asset, a host and combinations thereof.

Optionally, the method further comprising validating the risk factor associated with said at least one entity.

As appropriate, wherein the step of generating further comprises: creating an output list of potentially compromised client assets, if the risk factor indicates that the at least one entity is malicious, the output list comprising each of the plurality of assets communicating with the at least one entity.

Optionally, wherein the method further comprising: creating an output incidents report comprising data pertaining to the risk factor associated with each of the plurality of channels related entities. Optionally, the output incidents report is configured to be transmitted via the communication network to the at least one client network. Additionally or alternatively, the method further comprising the step of: creating an alert associated with a detectable security incident associated with at least one entity, the alert is configured to be transmitted via said communication network.

According to yet another aspect of the disclosure, a method is taught for detecting security threats associated with at least one client network, the method for use in a system, said system comprising: at least one network entity associated with the at least one client network and operable to enable outbound communication via a communication network; at least one asset associated with the at least one client network and operable to communicate with at least one of a plurality of hosts via the communication network; and at least one log-analytic detection platform operable to analyze a plurality of log files and further determine a risk factor associated with at least one super-channel, the at least one super-channel is characterized by a super-channel feature set, the at least one super-channel comprises: a set of channels, each said channel connecting an asset with a host, wherein said at least one host associated with a host-group, and wherein each channel being characterized by a characteristics vector and a channel identification pair, the method for operating the at least one log-analytics detection platform in an improved manner, the method comprising: obtaining the plurality of log files from the at least one client network, each of the plurality of log files comprising a plurality of communication records; identifying the at least one super-channel, wherein the set of channels associated with the at least one super-channel are determined by a shared similarity; extracting the super-channel feature set for the at least one super-channel; aggregating the super-channel feature set for the at least one super-channel into at least one data repository; and generating the risk factor for the at least one entity associated with entities of the at least one super-channel, the risk factor characterized by an entity score.

Optionally, wherein the step of obtaining further comprises: normalizing each of the plurality of log files by mapping fields associated with the at least one log record from a third-party format into a standard format.

As appropriate, wherein the step of identifying, comprises: identifying a set of channels having the same asset and a shared similarity into a super-channel; setting the asset of the supper-channel to be the asset of each channel having the common characteristics and setting the host-group of the super-channel to include the hosts of the associated channels; and creating a new super-channel for each channel that is not grouped, where the associated host-group comprises the host of the associated channel, wherein the shared similarity is based on identity or similarity in certain characteristics or based on similarity between a combination of characteristics of the associated characteristics vector.

As appropriate, wherein the step of extracting, comprises: extracting a set of attributes representing the associated super-channel feature set, the super-channel feature set characterized by at least one of: an identified similarity characteristics determined by the shared similarity associated with each channel of said set of channels, a communication behavior characteristics associated with at least one channel of the set of channels, a domain characteristics of at least one host of the associated host-group; and a host IP address characteristics of at least one host of the associated host-group.

As appropriate, wherein the step of aggregating, comprises: retrieving, from the at least one data repository, a stored super-channel and an associated stored super-channel feature set matching at least one of the set of channels associated with the at least one super-channel, wherein the matching comprises an identical asset and a common host or a similarity in characteristics of the associated channels; joining the host-group associated with the at least one super-channel into the host-group associated with the stored super-channel; joining the super-channel feature set associated with the at least one super-channel into the stored super-channel feature set; computing features for at least one entity associated with the stored super-channel; and storing the joined super-channel feature set for the stored super-channel of into the at least one data repository.

As appropriate, the step of computing comprises: joining host-group having at least one common host and updating the associated channels to relate to the joined host-group; grouping a set of super-channels associated with the same host-group; and computing the associated features of the host-group by joining the feature values associated with each super-channel associated with the host-group.

Variously, wherein the characteristics vector comprises data pertaining to at least one characteristic selected from a group consisting of: communication characteristics, domain name characteristics, IP address characteristics and combinations thereof, wherein the communication characteristics comprises data associated with at least one of the path and query parts of a URL, destination IP address, sequence properties; and wherein the domain name characteristics and IP address characteristics comprises data associated with at least one of the domain and subdomain of the host, the domain registration details, IP addresses of the domain and the domain site.

As appropriate, the method further comprising the step of merging associated host-groups based upon similarities, comprising: determining the shared similarity of a first super-channel with a second super-channel; and merging the associated host-group of the second super-channel into the associated host-group of the first super-channel, if the characteristic vector of the first super-channel is analyzed of being similar to the characteristic vector of the second super-channel.

As appropriate, wherein the step of generating, comprises: using an entity scoring model, the entity scoring model is operable to provide the entity score for the at least one entity; classifying the at least one entity to determine the risk factor according to the entity score; and storing pertaining data of the risk factor in said at least one data repository; wherein the entity score expresses the likelihood that the at least one entity is associated in a command and control (C&C) host communication. Additionally, the at least one log-analytic detection platform is operable to collect a plurality of classified entities and execute a supervised machine learning algorithm to determine the entity scoring model, and variously, each of the plurality of classified entities is selected from a group consisting of a super-channel, a host-group, a channel, an asset, a host and combinations thereof.

As appropriate, wherein the method further comprising: creating an output incidents report comprising data pertaining to the risk factor associated with each of the set of channels related entities.

As appropriate, the step of generating, comprises: using an entity scoring model, the entity scoring model is operable to provide the entity score for the at least one entity; classifying the at least one entity to determine the risk factor according to the entity score; and storing pertaining data of the risk factor in the at least one data repository; wherein the entity score expresses the likelihood that said at least one entity is associated in a command and control (C&C) host communication.

As appropriate, wherein step of merging, comprises: determining the shared similarity of a first super-channel with a second super-channel, such that the associated host-group comprises at least one C&C host; and merging the associated host-group of the second super-channel into the associated host-group of the first super-channel, if the first host-group comprises no C&C hosts and the second host-group comprises at least one C&C host, such that all associated hosts of the merged host-group are marked as C&C hosts.

BRIEF DESCRIPTION OF THE DRAWINGS

For a better understanding of the invention and to show how it may be carried into effect, reference will now be made, purely by way of example, to the accompanying drawings.

With specific reference now to the drawing in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawing making apparent to those skilled in the art how the several forms of the invention may be embodied in practice. In discussion of the various figures described herein below, like numbers refer to like parts. The drawings are generally not to scale.

In the accompanying drawings:

FIG. 1 is a configuration diagram schematically representing an example of one possible configuration of selected elements of a log-analytic malware detection system for identifying suspected communications;

FIG. 2 is a configuration diagram schematically representing another possible example of selected elements of a log-analytic malware detection system for log-analytic malware detection in a business entity deployment comprising a plurality of organizational assets (such as content servers);

FIG. 3 is a configuration diagram schematically representing yet another example of selected elements of a system for malware detection using log analysis;

FIG. 4 is a schematic block diagram representation illustrating selected components of a log analytics system back-end using a supervised machine learning model for security breach detection;

FIG. 5A is a block diagram representation illustrating a communication channel associated with an organizational client-asset and a host.

FIG. 5B is a block diagram representation illustrating a super-channel associated with outbound communication between an organizational client-asset and a plurality of similar hosts;

FIG. 5C is a block diagram of various channels and super-channel configuration diagram illustrating an organizational deployment of client-assets communicating with hosts located variously in the Internet;

FIG. 6A is a block diagram illustrating two super channels prior to merging based upon similarities of their associated characteristic vector;

FIG. 6B is a block diagram illustrating two super channels after merging based upon similarities of their associated characteristic vector;

FIG. 7A is a flowchart representing the main steps of a method for identifying malicious communications using channel based log analytics;

FIG. 7B is a flowchart representing the main steps of a method for aggregating channel associated features;

Figure 7A:
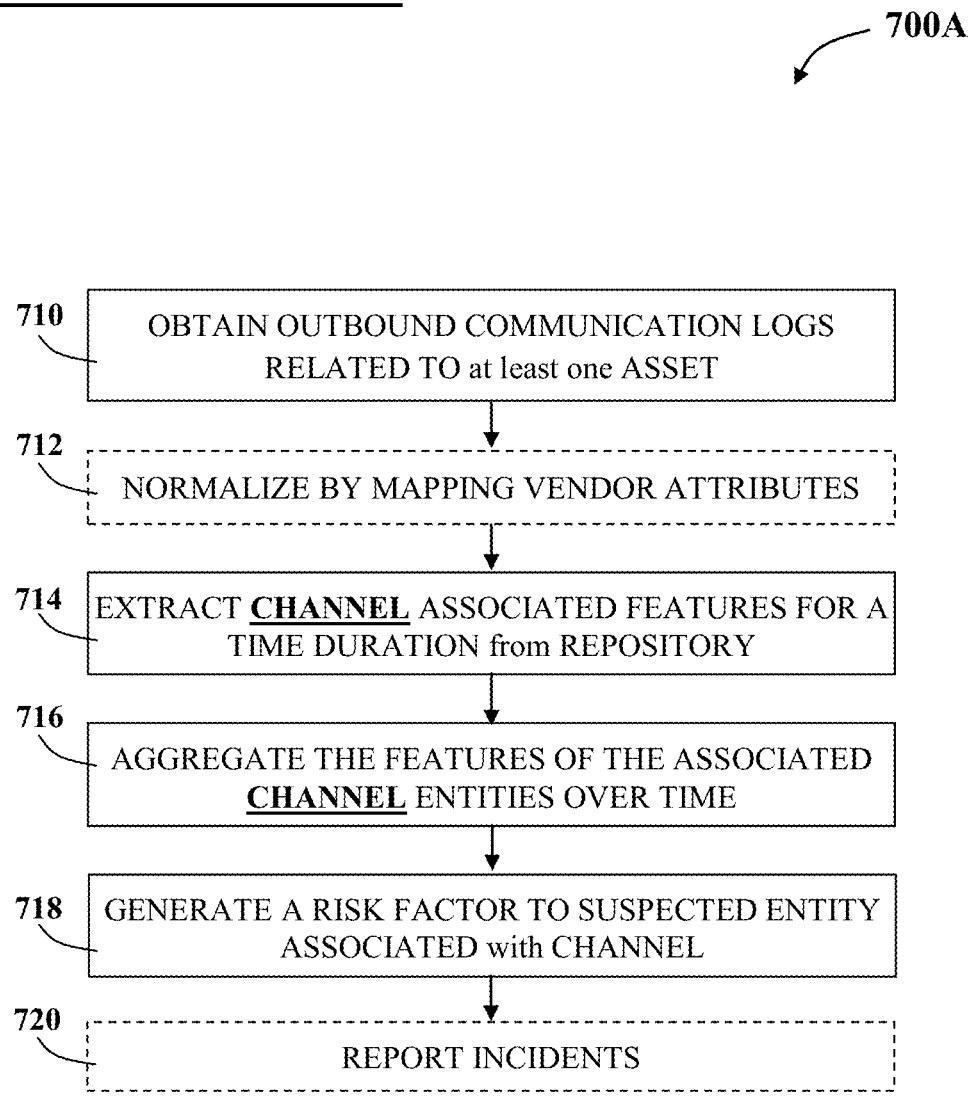
Figure 7B:
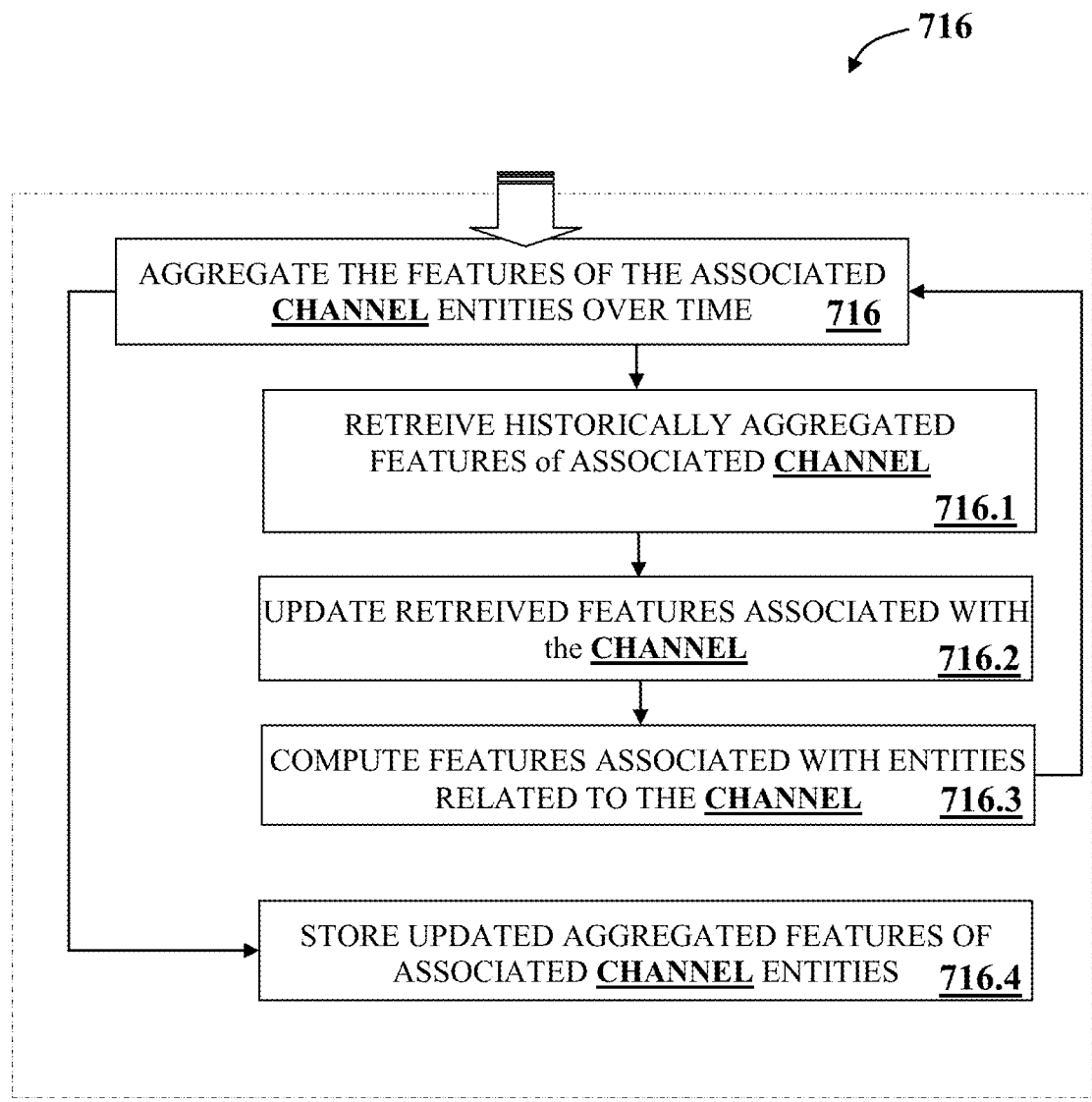
Figure 7C:
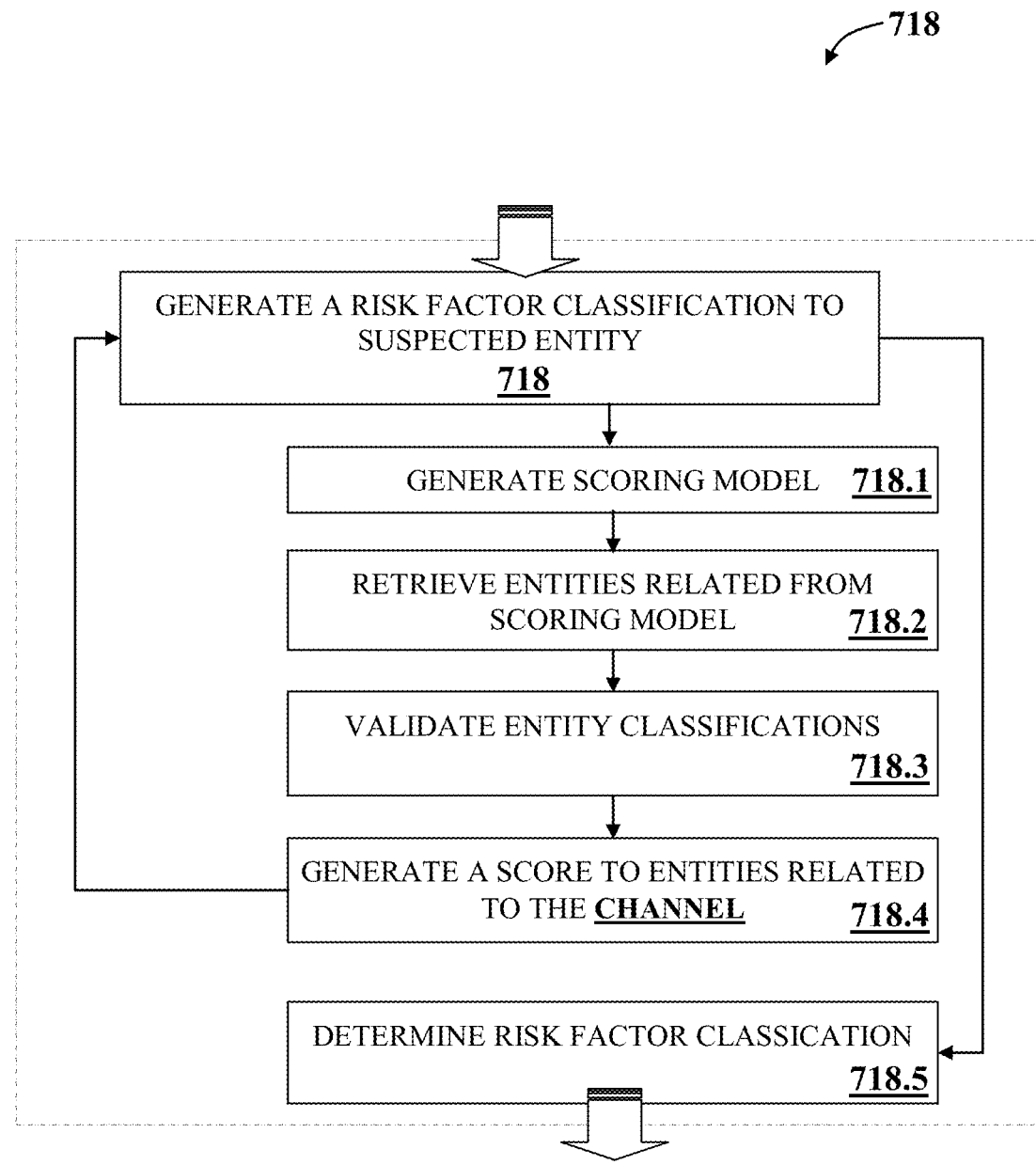
Figure 8A:
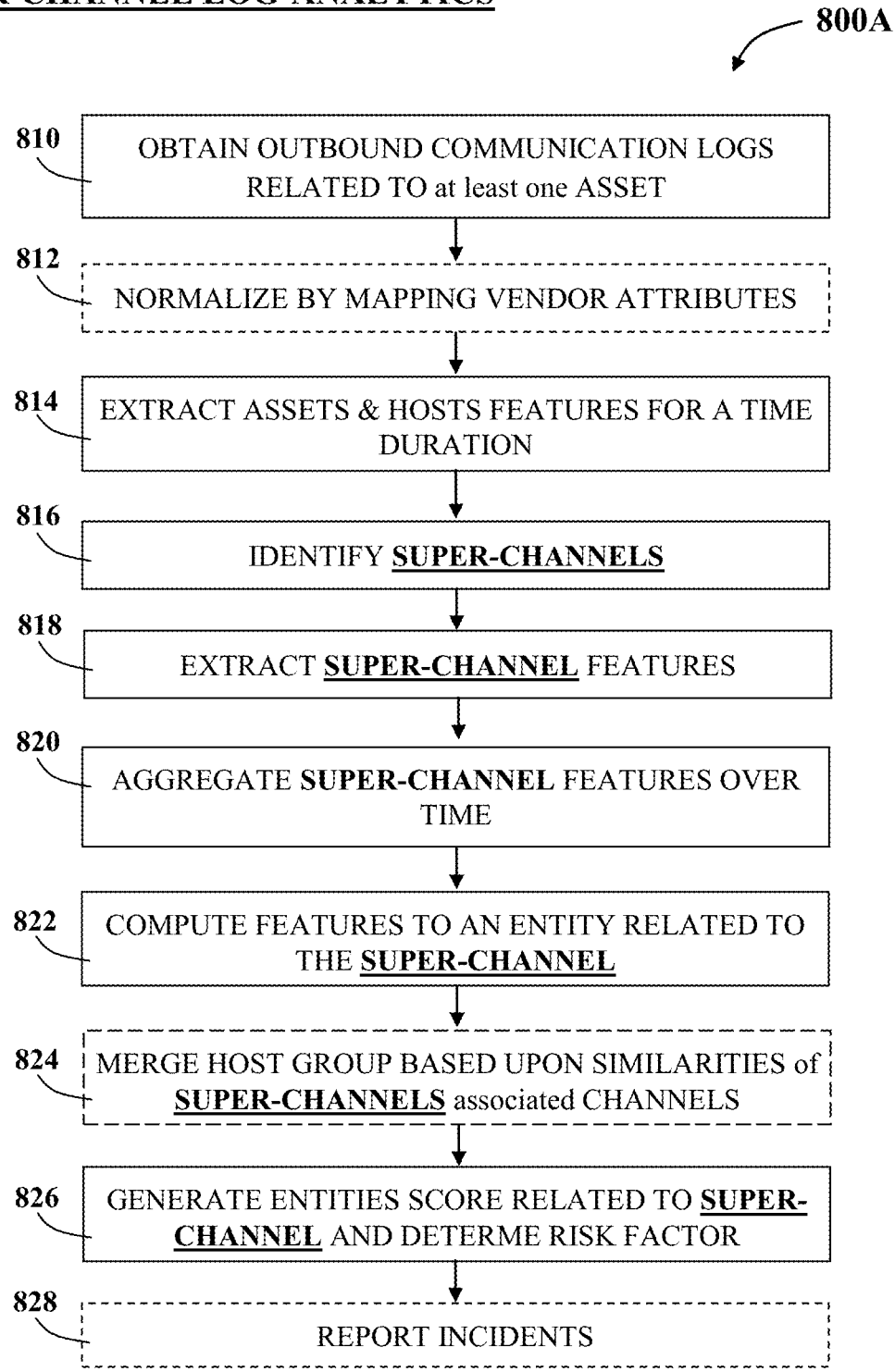
Figure 8B:
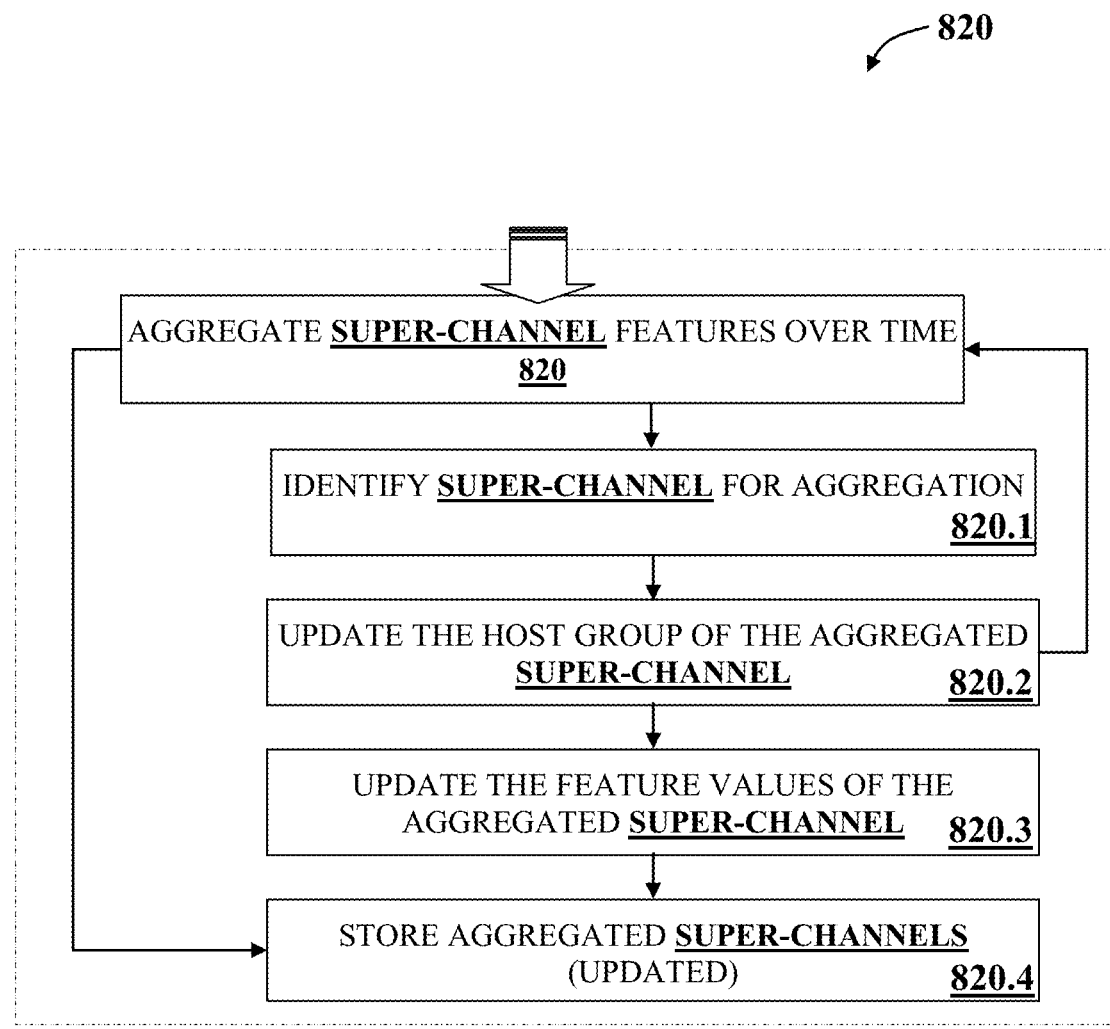
Figure 8C:
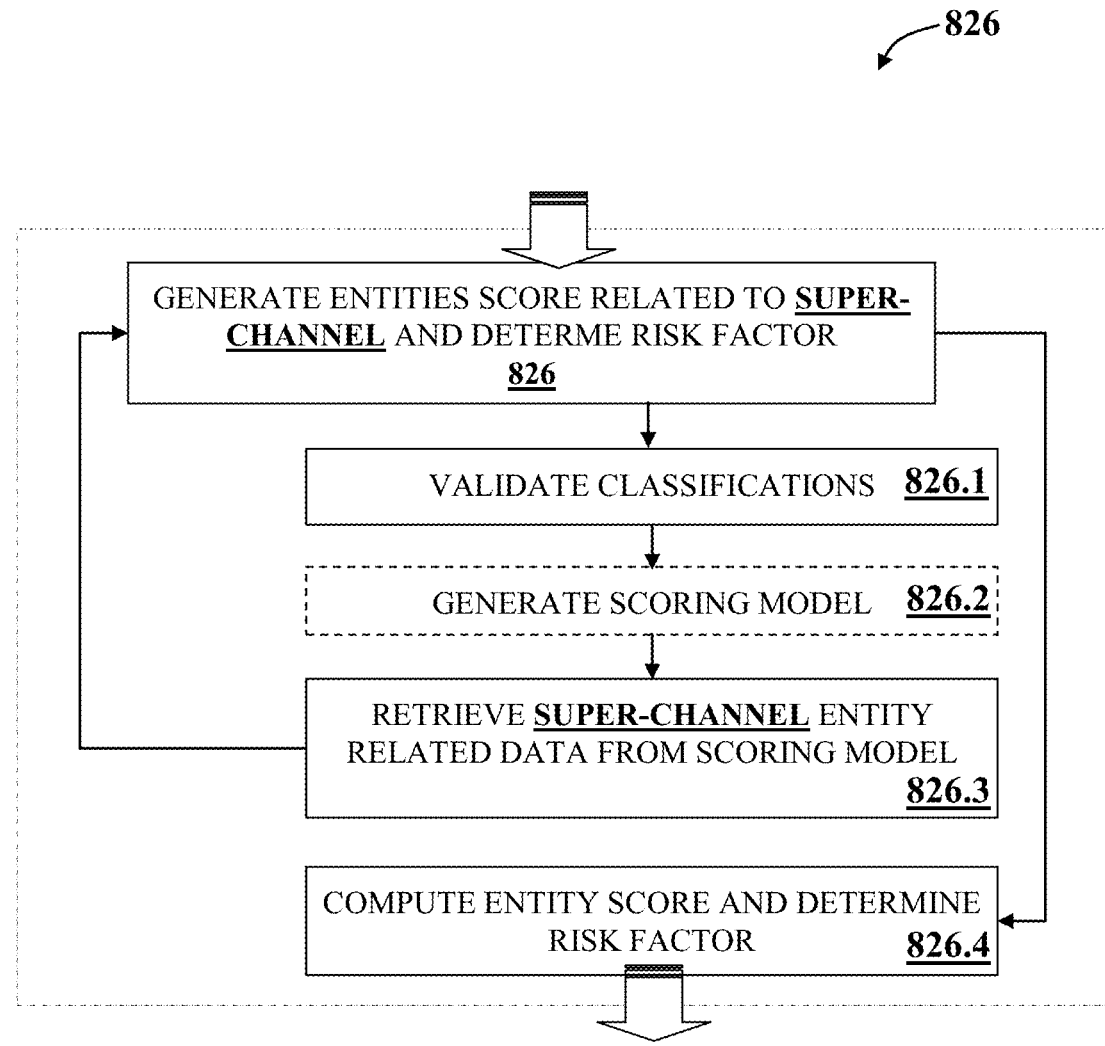

FIG. 7C is a flowchart representing the main steps of a method for generating a score to channel associated entities and determining the associated risk factor;

FIG. 8A is a flowchart representing the main steps of a method for identifying malicious communications using super-channel based log analytics;

FIG. 8B is a flowchart representing the main steps of a method for aggregating super-channel associated features; and FIG. 8C is a flowchart representing the main steps of a method for generating a score to super-channel associated entities and determining the associated risk factor.

DETAILED DESCRIPTION OF THE INVENTION

It is noted that the systems and methods of the disclosure herein may not be limited in their application to the details of construction and the arrangement of the components or methods set forth in the description or illustrated in the drawings and examples. The systems and methods of the disclosure may be capable of other embodiments or of being practiced or carried out in various ways.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

It is noted that in order to implement the methods or systems of the disclosure, various tasks may be performed or completed manually, automatically, or combinations thereof. Moreover, according to selected instrumentation and equipment of particular embodiments of the methods or systems of the disclosure, some tasks may be implemented by hardware, software, firmware or combinations thereof using an operating system. For example, hardware may be implemented as a chip or a circuit such as an ASIC, integrated circuit or the like. As software, selected tasks according to embodiments of the disclosure may be implemented as a plurality of software instructions being executed by a computing device using any suitable operating system.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data. Optionally, a network connection may additionally or alternatively be provided. User interface devices may be provided such as visual displays, audio output devices, tactile outputs and the like. Furthermore, as required user input devices may be provided such as keyboards, cameras, microphones, accelerometers, motion detectors or pointing devices such as mice, roller balls, touch pads, touch sensitive screens or the like.

Known Malware Types & Methods

Command-and-control servers, also known as C&C or C2, are used by attackers to maintain communications with compromised systems within a target network, within an organization, for example. A compromised system may include various infected client assets communicating with C&C hosts via malware installed on these organizational networked devices.

Malware types may include examples of computer viruses, worms, bankers, proxy, DDoS, password stealers, fake anti-virus, spammers, downloaders, Trojan horses, ransomware, spyware, adware, and other malicious programs.

The term 'worms' is given to self-replicating malware which uses a computer network to send copies of itself to other computers on the network.

The term 'bankers' is given to malware which steals banking information.

The term 'DoS' is given to malware which is used for Denial-of-Service attack against websites or networks.

The term 'password stealers' is given to malware which steals any type of information.

The term 'Fake Anti-Virus' is given to malware which misleads users into paying for a fake removal of malware.

The term Spammers' is given to malware which uses an infected computer to send spam emails.

The term 'Downloaders' is given to malware which downloads other malware to an infected computer.

The term 'Trojan horse' (commonly referred to as Trojan) is given to a type of malware that disguises itself as a normal file or program to fake users into downloading and installing malware. A Trojan can give a malicious party remote access to an infected computer.

The term 'ransomware' is given to a form of malware that essentially holds a computer system captive while demanding a ransom. The malware restricts user access to the computer either by encrypting files on the hard drive or locking down the system and displaying messages that are intended to force the user to pay the malware creator.

The term 'spyware' is given to a type of malware that functions by spying on user activity without their knowledge. These spying capabilities can include activity monitoring, collecting keystrokes, data harvesting (account information, logins, financial data), and more.

Malware types may be differentiated according to criteria such as self-distribution, point of control, data stealing, level of protection and the like. The self-distribution is the capability of the malware to spread itself to other computers. Point of control refers to the capability of the malware to be controlled by a central remove server, for example its vulnerability to receiving commands, sending information, automatic updating and the like. Data stealing refers to the capability of the malware to send information from the computer to a remote server.

The level of protection against malware refers to the systems put into place by the malware author in order to decrease detection by end point security products, such as anti-virus software, malware detection software, and the like, and gateway protection software, such as firewalls and the like. For example, some malware is designed to be polymorphic, for example changing executable signature, while maintaining the malware payload. Some malware may use encryption of the network communication between the malware and a drop zone at a criminal server. Furthermore, cyber criminals use different methods to infect machines with malware. Examples include the social engineering, exploitation of specific vulnerabilities, use of exploit kits, distribution of email attachment and the like.

Social engineering is one method for deceiving users into downloading malware. In one example a website which offers to show a video. In order to view the video the user is required to download software purporting to be an update for commonly used software such as Adobe Flash or the like. In reality the update is an executable file installing malware onto the host.

Specific vulnerability may be identified and exploited, certain malicious webpages, for example, exploit known vulnerabilities of a browser, application or operating system in order to install the malware surreptitiously.

Exploit kits are a collections of exploits traded in the underground, and used by cyber criminals to increase the probability of installing the malware surreptitiously.

Email attachments are often used to distribute malware to unsuspecting recipients. For example, executable files may be attached to spam email or email purporting to be from a member of the user's contact list. A botnet generally comprises a set of malware infected computers, or bots, all connected to a common criminal sever, also known as a bot server, or a bot server set comprising a plurality of bot servers. The bot server or bot server set may include a command and control module, which is able to control all the infected computers, an update module which updates the malware code in the infected computers, and a drop zone for collecting data received from the infected computers.

Channel/Super-Channel Log Analysis

Various embodiments of a log based analytics system and methods associated with communication channels, and further with super-channels for protecting a plurality of client networks from security threats are disclosed hereinafter. The system includes security threat management services which are operable to minimize business risks by providing a reporting and alerting mechanism upon detection of malware attack events associated with a plurality of client-assets and of various other network entities. The system may be configured to aggregate, normalize and analyze log information from multiple sources, identify malicious content and communications, hostile hosts, servers and botnets. The system is further operable to utilize proprietary machine learning algorithms for behavioral detection and screening, applying threat intelligence of additional data collected and cultivated, thus provide better security management and pin-pointing corporate specific attacks. Using the system, users, such as network administrators and the like, may advance better security management, ability to pin-pointing corporate specific attacks and become capable of protecting and better sealing a domain against cyber penetration and leakage. Furthermore users may be able to identify cyber adversaries in real time and gain accurate visibility to possibly compromised business client-assets.

It is noted that generating a risk factor may further include providing an output list of potentially compromised network entities in a specific business entity/customer premises. Such an output list may include a list of organizational network entities (internal network entities) possibly communicating with at least one entity.

As used herein, the term "client networks" is associated with business entities and customers and may comprise various communication and computing devices optionally residing in public, private and protected networks.

As used herein, the term "server" refers to a computer designed to process requests and deliver data to other (client) computers over a local network or the Internet. Servers are used to manage network resources such as a Web server, a Proxy Server, an FTP Server, a Firewall, a domain name server (DNS), a router, a gateway.

As used herein, the term "log file" refers to any recording of data representing a list of activities (events) "logged" by a computer/server. It is noted that the term "log file" may also related to a syslog which is a widely used standard of message logging, allowing to separate between the system generating the messages and the system string the messages. It is noted that, in particular the outbound communication could be http or https communication.

As used herein, the term "asset", "client asset" or "client-host" refers to an organizational communication device operable to communicate with other communication devices over a network, such as the Internet.

As used herein, the term "host", "host" refers to a computer or other device providing data or services that a remote computer can access by means of a network or a modem. Specifically, this term may be associated to a computer that is connected to a TCP/IP network such as the Internet.

As used herein, the term "channel" refers to the communication between a client asset, as the source, and a host as the target, over a time duration.

As used herein, the term "super-channel" refers to communication between an asset, as the source, and a group of similar hosts, as the target, over a time duration.

As used herein, the term "super-channel host-group" or "host-group" refers to the set of super-channel associated hosts in which an asset (or a client-asset) is communicating with, over a communication network.

As used herein, the term "shared similarity" refers to a set of shared features associated to at least two channels/super-channel to determine the level of the similarity between entities. In various embodiments, the system may use a characteristic vector configured to group a set of features or attributes, characterizing a specific entity being examined to assess associated similarity.

The current disclosure relates to systems and methods for log-analytics, operable to detect malware attacks based upon usage of channels and super-channels analysis of log data for identifying malicious communications, such as Command and Control (C&C) communications with internal organizational assets.

The Log-Analytics mechanism provides malware attack detection based upon channel and super-channel associated features, which may be retrieved from the various log files, or computed accordingly. Overall, the log-analytics mechanism performs various steps to determine the risk factor associated with an entity, such as retrieving log files, normalizing the logged data, aggregating related entity features, classifying the entity and associating a score to the entity as a tool of determining the risk factor, as described hereinafter.

Retrieving

As used herein, the term of "retrieving" refers to obtaining the log files, possibly from several client asset sources, uploaded onto the network based log-analytics detection platform. The log files may be associated with diverse product vendors and linked with various customers. Variously, the log files may include log records having standard fields.

It is noted that the log files are usually obtained from gateways and proxy servers that record the outbound communication from the organization to the Internet, in particular http/https communication. Additionally or alternatively, log files of the outbound traffic from other sources such as the client-assets, various network devices and the like.

It is further noted that the log data is not necessarily retrieved from log files, but rather may be obtained from any recording of the communication that may be streamed to the system that analyzes the logs.

As appropriate, the retrieved log records may be stored in a data repository and used accordingly in the various steps of the log-analytics process.

As appropriate, retrieved log records may be associated to a time period, such as the last hour, the last day and the like, as a repeating process.

Optionally, the log records may include categorization fields added by a specific vendor. Most commonly, in which case where http communications is used, the http log may include fields such as: time, source IP address of the asset, destination URL, destination IP address, method (POST, GET, . . . ), User Agent, bytes in, bytes out and more.

Normalizing

As used herein, the term "normalization" refers to mapping varying terminology of a log record message parts from different log sources to read the same format, such that the analysis, reports and statistics may be derived from a heterogeneous environment of security vendors.

The step of normalizing is the step of standardizing the third party format (TPF) log records of different vendors/customers having various log file categorization fields by mapping existing TPF log record fields into a unified set of normalized fields. The set of normalized log records are not specific to a particular vendor, in terms of field name and type, thus providing a common denominator for comparison and analysis.

Variously, other field values may further be normalized. For example, gateway logs may include possible actions such as 'permit' and 'block', and upon normalization 'permit' becomes 'allow' and 'block' becomes 'deny'.

Aggregating

As used herein, the term "aggregating" refers to gathering and collecting information over time of entity related features. As appropriate, based upon the type of the entity, "aggregating" may involve computing of associated entity features using information retrieved from log records identified as related to the same entity. The aggregation phase may insert new entities into the repository if the entity does not exist, or update an existing entity.

An entity, in this context may be a thing about which data may be stored and specifically, an entity may be a channel, an asset or a host when log-analytics is associated with respect to channels. The reference to an entity may be broadened, when the log-analytics is associated with super-channel, adding reference to the super-channel and the hosts group as entities.

It is noted that logs may be associated to communications from a network entity to a host in the internet.

Additionally or alternatively, the categorization attributes of an entity may be related to the source of the logs—the customer. This may further contribute in the analysis, if the categorization attributes are customer specific.

Classifying

As used herein, the term 'classifying' refers to determining the classification of an entity as malicious (threatening) or non-malicious (non-threatening). As appropriate, 'classifying' may be a simplified automated decision, for example, relying on the associated score compared to a threshold value.

The associated score may represent the probability of an entity to be malicious (threatening) or non-malicious (non-threatening). When the entity is representing a host, the entity associated score typically relates to whether or not the host is C2 (Command and Control, C&C). The associated score may be a Boolean where '0' stands for being non-malicious and '1' stands for being malicious. Optionally, the associated score may be numeric representing a number between 0 to 1 indicating a probability value, or may further be represented by a confidence level, as described hereinafter.

It is noted that 'classifying' may use additional information to reach a decision, such as behavioral characteristics, optionally extracted from log records or may use external entity related information. Furthermore, a machine learner classifier may be used to allow consideration of a wider range of entity features.

Moreover, the "classifying" may include manual review of experts examining or researching an entity when certain conditions are held in order to determine an associated classification.

It is noted that in some implementations, a machine learning predictor (predicting step) and a machine learning predictor that considers additional features (classification step) may be unified into one predictor machine analyzing the categorization attributes combined with other features.

Where appropriate, the classification of an entity may be stored in an 'Entity Classification' repository. Optionally, the classification of the entity may be an output of the "classifying" process.

The method as defined herein may be used as a futuristic detection and protection method superior even to zero-day attacks recognition. The analysis performed on the traffic may be used to identify potential attacks yet to be executed by criminal servers. The criminal servers may be in a latent state, but the analysis of traffic may identify them before they launch their attacks.

Log Analytics

Using the Internet to solicit feedback from an active community of customers may reduce the amount of time spent by the individual. Specifically, for security analysis purposes, data input received, originating from a network of client networks representing a plurality of business units or customers, may enable detection of malware attacks in an improved manner. The data input comprising log file information generated by one or more types of security products of different vendors may be received from a plurality of client networks representing a plurality of customers. Extracting and analyzing data from a variety of sources may enable detection of malware attacks which may otherwise be undetectable if a single site is only analyzed. Further, low profile malware attacks that are tough to detect in a single client network deployment may be detected by aggregating evidence from a plurality of organizations over time. Moreover, security attacks analyzed from a plurality of security vendor product sources may detect security attacks non-detectable by a security product associated with an individual security vendor only.

Accordingly, log based analysis may be determined and associated with various spaces such as security product vendors, customer organization, organization market verticals (finance, health, transport etc.) and the like.

Where appropriate, a log based analysis system may analyze a business unit or customer logs in massive parallel processing of log file batches several times a day to detect malicious communications within these logs. Consequentially, the system may alert confirmed breaching incidents of devices in the client network infected by malware and have communicated with Botnets or even ex-filtrated data.

It is noted that logs may be generated by a business unit or a customer using various security products installed on various client/server machines within a business unit client network deployment. Variously, the security product may be an organizational content server (Web servers, files servers, FTP servers, Anti-Virus servers and the like), a proxy, a next generation firewall, an Intrusion Prevention Systems (IPS), an Intrusion Detection Systems (IDS) and the like; each may be associated with various security vendors.

In particular and in contradistinction to the current system, malware protection systems known in the art, such as software or hardware installations or network configuration do not use log based security analysis using learning knowledge systems. Further, it will be demonstrated hereinafter, that the current system is capable of providing extensive coverage of many malware family types, regardless of their characteristics and methods of infection based upon log based analysis using a plurality of log files associated with various business units and customers and product vendors.

Figure 1:
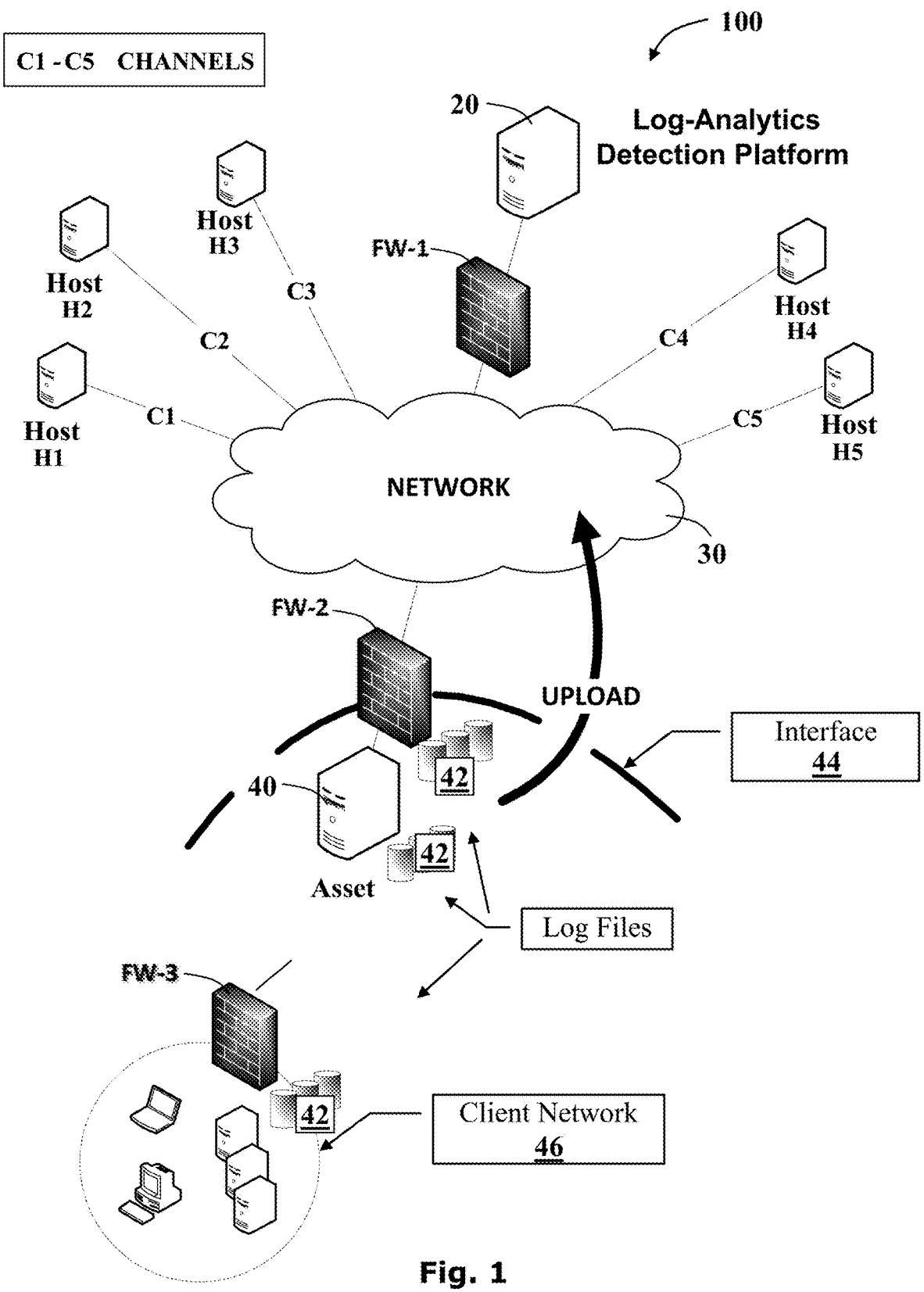

Reference is now made to FIG. 1, there is provided a representation of one possible configuration of selected elements of a system, which is generally indicated at 100, for identifying communications to hosts (C&Cs) connectable with a public network such as the Internet using log analytics. The log analysis system 100 comprises a log-analytics detection platform 20 accessible via a firewall FW-1 and operable to perform log analysis using log files 42 associated with a content server 40, front-end firewall FW-2 and back-end firewall FW-3 uploaded via an interface 44 through the communication network 30. The log files 42 may be associated with a content server (client-asset) 40, front-end firewall FW-2 and back-end firewall FW-3. The content server (client-asset) 40 may be connectable through a client network and operable to connect with the public network, such as the internet or 'the Web', may be accessed by via a front-end firewall FW-2. The content server 40 may have further access to an internal client network 46. Optionally, access may be limited to various regions of the internal client network 46 by a back-end firewall FW-3.

It is noted that the system 100 may represent a partial network subset of a business entity or a customer.

In this embodiment, the content server (client-asset) 40 may be configured to function variously according to the business entity or customer needs. As such the content server (client-asset) 40 may function as an internet server, a file server, a communication server and the like. As such, the log files may contain log information according to the security product installed on the specific server machine. Thus, the log information may relate to the classification of the network traffic inspected through the server machine, for example, to allow analyzing the traffic as malicious or non-threatening.

It is further noted that each security product vendor may have particular capabilities to detect various attacks derived from different information collected by the product vendor and may further use different technologies. Further, when a communication event is classified as malicious, the product's log file may contain information associated with decisions whether to block or allow the communication through; reason for the classification, category of malware and risk level; type of malware and its objective; identity of the host that the malware tried communicating with and more. The format of each product's log file may be peculiar to that product.

Additionally or alternatively, the security product may decide to block communication due to a policy violation. As appropriate, the data pertained to this security event may be recorded and logged in the log file, including the blocking event details and the applicable reasons.

Moreover, the log based analysis using knowledge learning algorithms may be operable to reflect and provide customers with a benchmark tool for comparing security products owned by customer and other security products. Additionally, the use of combined malicious traffic reported by different security vendors may allow generalization of detection patterns for malware. For example, by creating patterns of malware URLs, thus, enabling finding out more unknown incidents of malware. Where appropriate, the analysis may use log file information, such as policy decisions to block traffic, in order to help additional tools that flagged a host as suspicious but not confirmed to convey malicious communications.

Figure 2:
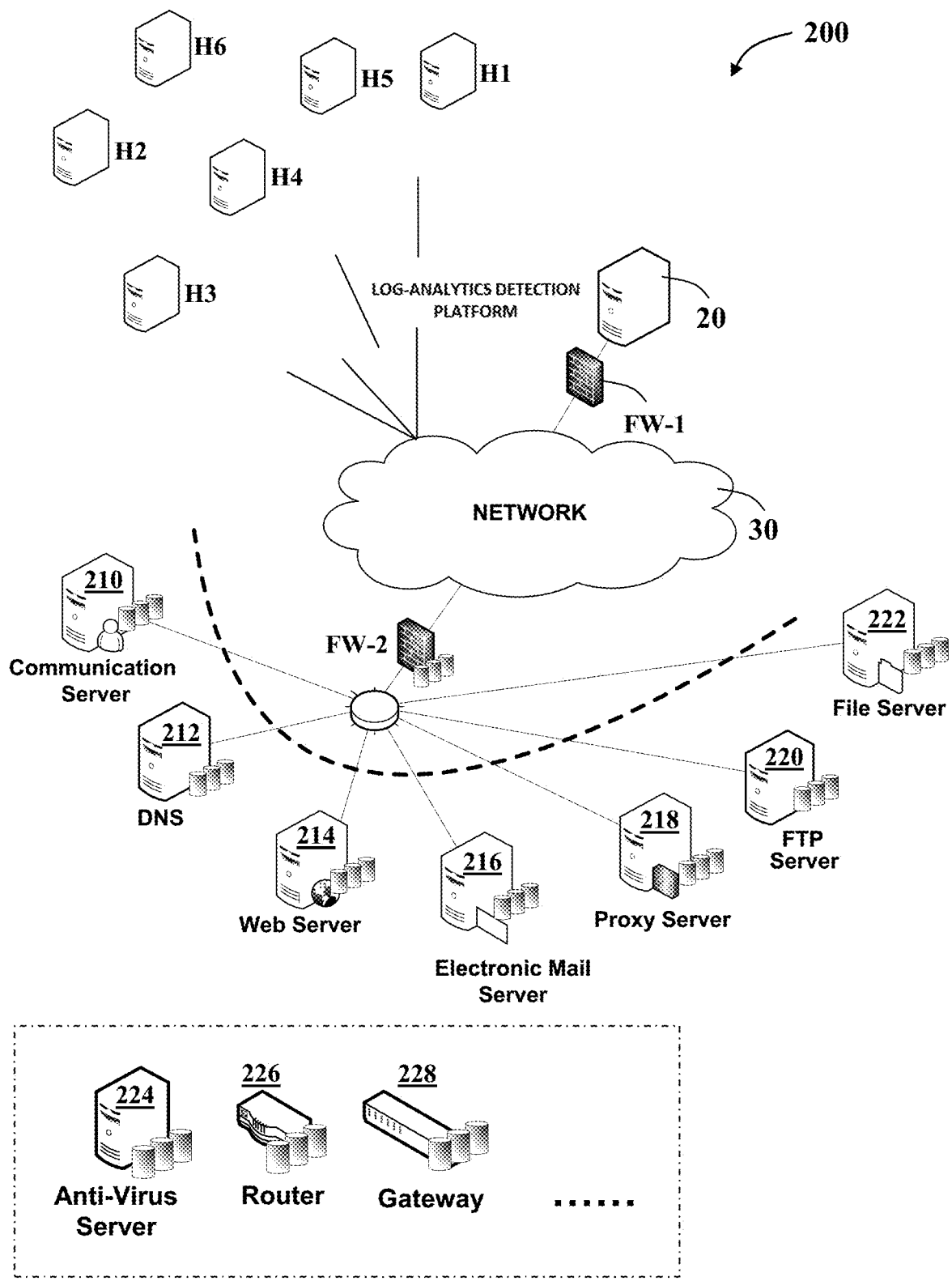

Reference is now made to FIG. 2, representing the major components of another possible configuration of selected elements of a system 200 for log-analytics malware detection using log information from various client asset machines, operable under the umbrella of a client network representing a possible organization/company/business unit and the like.

The log-analytics malware detection system 200 comprises a log-analytics detection platform 20 accessible via the firewall FW-1 and operable to perform log analysis using a plurality of log files, each of the plurality of the log files may be associated with one or more of a plurality of organizational client assets, such as content server machines. Further, the plurality of organizational content server machines may be connectable to the network via a front-end firewall FW-2 having associated logging capabilities.

Such organizational client assets of content servers may include, but not limited to, a Communication Server 210, a Domain Name Server (DNS) 212, a Web Server 214, an Electronic Mail Server 216, a Proxy Server 218, an FTP Server 220, a File Server 222 and the like. Optionally, other devices may be part of the client network logging relevant log information, such as an Anti-Virus Server 224, a Router 226, a Gateway 228 and more.

Each content server machine may be connectable via an internal client network. Optionally, more than one server machine may be associated with an internal client network, where each client network may represent an organizational sub-section or a department.

Optionally, various internal client networks may be further protected behind an internal firewall (not shown).

In this embodiment, it is noted that the plurality of content servers may be associated with a plurality of client networks, each performing client functions or representing various sub-organization within a customer network deployment.

Figure 3:
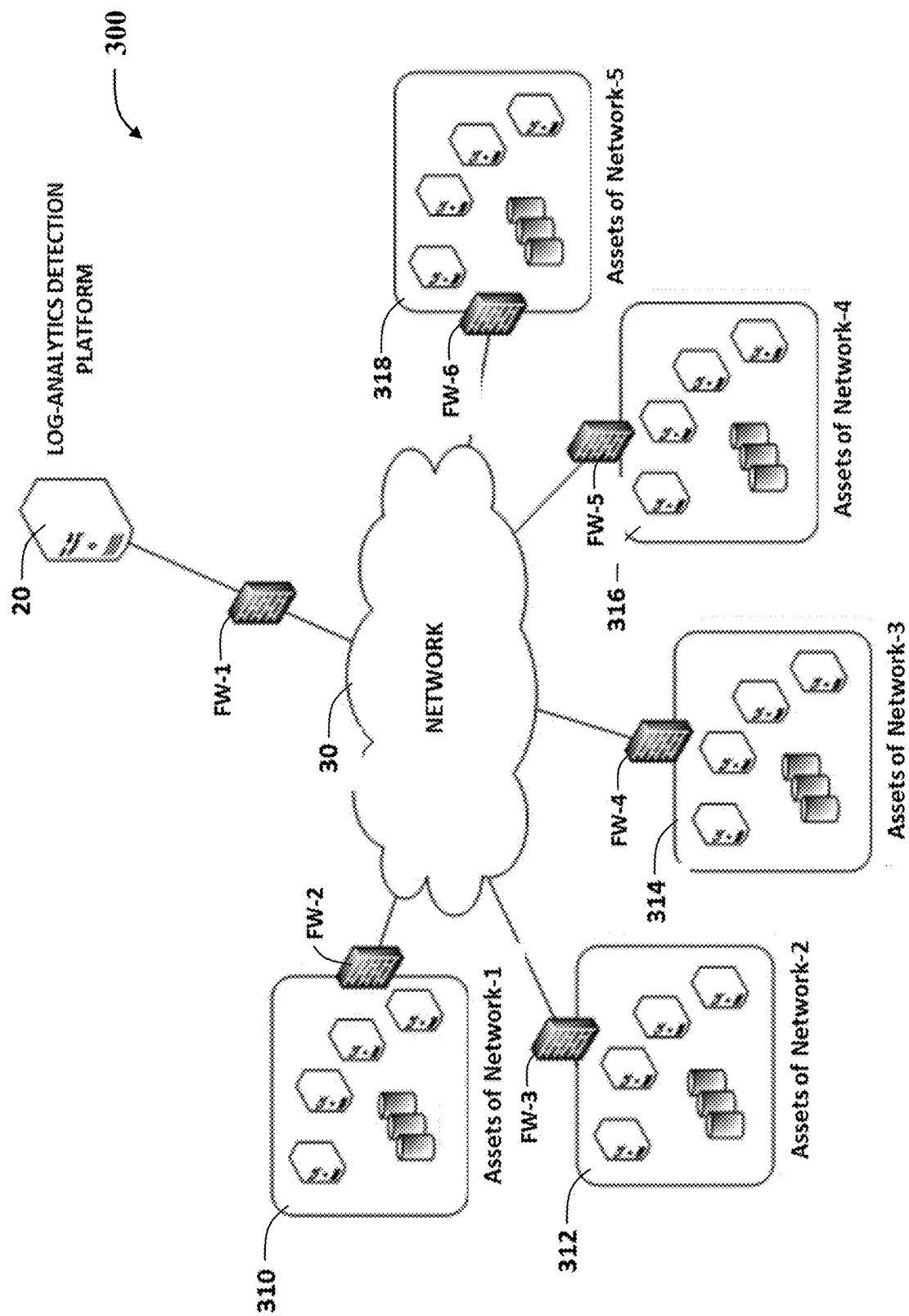

Reference is now made to FIG. 3, there is provided a representation of yet another possible configuration of selected elements of a system, which is generally indicated at 300, for log analysis. The system spans over a plurality of client networks, where each network may represent a different organization or customer.

In this embodiment, the log analysis system 300 comprises a log-analytics detection platform 20 accessible via the firewall FW-1 and operable to perform log analysis using a plurality of log files, each of the plurality of the log files may be associated with one or more of a plurality of content server machines of client networks associated with various business entities or customers and may have a format peculiar to it. Further, the log analysis system 300 is operable to retrieve log files from a plurality of client networks and further provide reporting and alerting mechanisms.

In this embodiment, the log analysis system 300 comprises a plurality of client networks; each may represent a separate organization or a department in a specific commercial entity. The plurality of client networks 310 through 318 may each be protected by a front-end firewall, such as the front-end firewall FW-2 protecting client network 310.

As described hereinabove, log files are retrieved from various client networks representing different business entities or customers and log information of a variety of security product associated with a plurality of security product vendors.

It is noted that malware attacks are characterized by the frequent appearance of new types of attacks. For example, new types of attacks may be characterized by a type unknown before, of malware and/or new command and control hosts that malware communicates with. When the log analysis system detects a new type of attack in a log file of a client network associated with, say, business entity A, the system may use this information to better detect or prevent attacks in another client network associated with another business entity or customer.

For example, the characteristics of a detected security attack/malicious communication associated with a business entity may be added to a profiler database to enable blocking such malicious communication at some point of time in another business entity. Additionally, a security event in a client network is possibly detectable based upon similarities to such a security event in another client network. Further, client networks A, B and C are attacked, thus statistical indicators may be derived by aggregating data from these client networks to analyze and pin-point to a possible malicious activity.

It is noted that, as stated hereinabove, the log-based analysis may refer to market verticals. The market verticals, evidently are suffering malware attacks jointly in specific times. Thus, the log based analysis is operable to provide statistical indicators for each vertical increasing the probability of detection and further reducing false positives.

For example, security events in a plurality of client networks A, B and C of a specific may trigger generating statistical indicators derived from aggregating data from these client networks to enable pin-pointing to a malicious activity. A similar security event in another client network of the same vertical may be prevented by deriving thresholds specific to this vertical based upon client networks A, B and C's analysis. The use of specific thresholds per vertical may reduce the probability of reporting false positive incidents. For vertical X, for example an average of 100 communications a day from a client to hosts in a location is non-threatening, but for vertical Y, over 10 times a day is a strong indicator of a malicious activity in another location.

It is further noted that security event incidents may be reported in numerous ways such as a web portal, a web API, through dedicated connectors into different Security Information and Event Management (SIEMs), a dedicated management application (Splunk at www.splunk.com, for example) and the like.

Machine Knowledge Learning

Internet security is challenging, and the types of threats computers are exposed to are rapidly increasing. Security teams are overwhelmed by the number of Indicators of Compromise (IOC) generated by many security products, particularly as many of these IOCs are simply false leads. A machine learning approach operable to consume and process large quantities of data offers significant advantages over traditional approaches for detecting malware attacks. Machine learning algorithms perform exceptionally well when leveraging the quantity of data generated by logs to accurately identify and classify the anomalous behavior or subtle differences that lead to the detection of attack.

There are two common approaches to machine learning, a "supervised learning" approach and an "unsupervised learning" approach. The current disclosure uses supervised learning, thus needs to provide the learning algorithm with a "training set" of examples that include pairs of input data and the desired or predetermined output or classification. In the case of attack detection, the "training set" includes input data for both nonthreatening and malicious (threatening) behaviors paired with the correct classification or identification. When applied to attack detection, supervised machine learning can leverage a very rich training set through rigorous analysis of communication attributes such as day/time stamp, duration, path, periodicity (and dozens of others) combined with the inter-relationships between these attributes. When a new and unknown data set is introduced, the algorithm determines whether it contains a record of nonthreatening or malicious communication. The machine-learning algorithm then incorporates this new "knowledge" into its algorithm. The learning algorithm will also provide a confidence level of its identification.

Log Analytics Back-End

Figure 4:
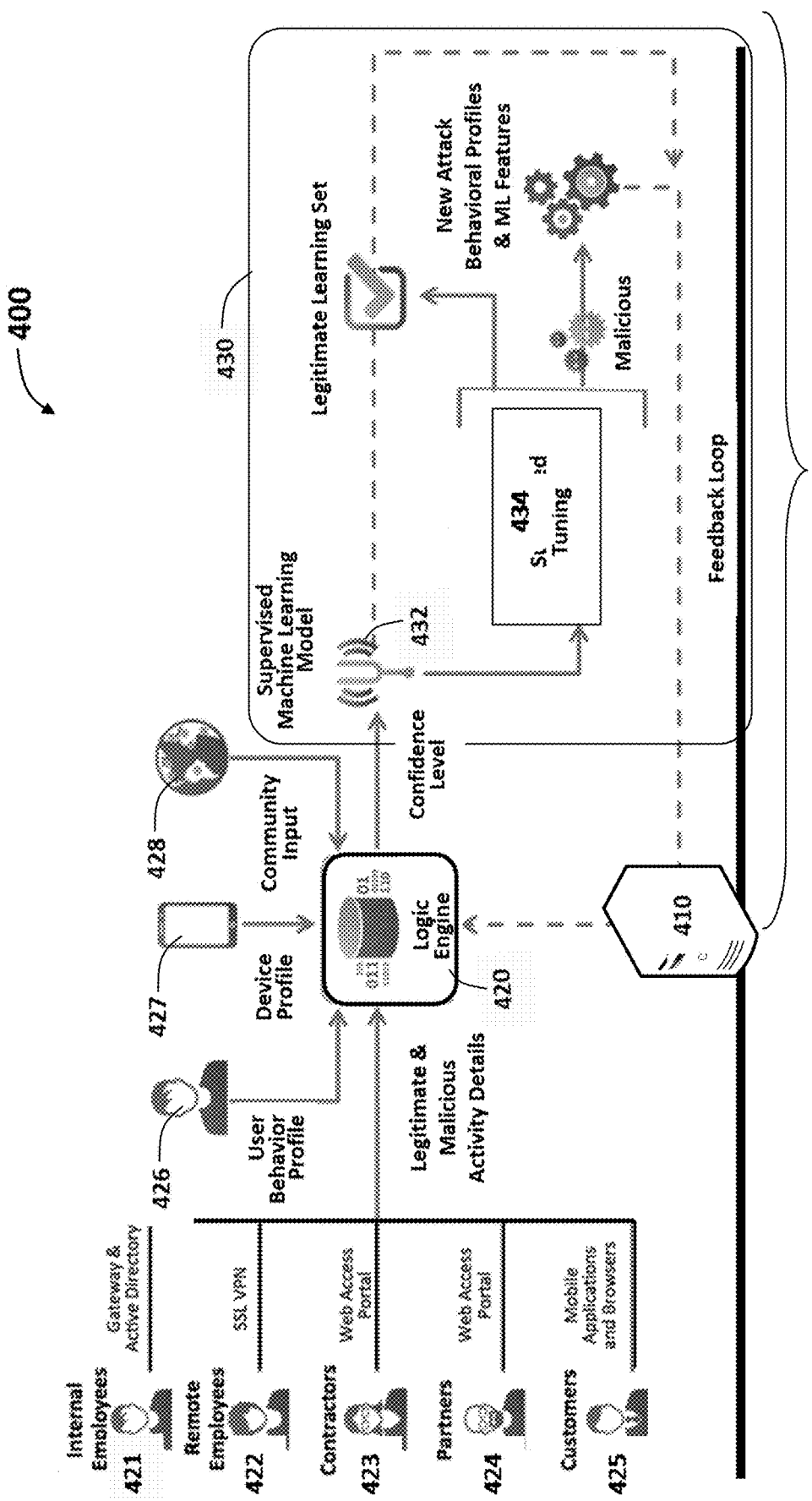

Reference is now made to FIG. 4, there is provided a schematic block diagram representation illustrating selected components of a log analytics system backend, which is generally indicated at 400, using a supervised machine learning model for security breach detection. The block diagram representation 400 of the log analytics system may include a breach detection analyzer 410 which may further include a logic engine 420 and a machine learning engine 430.

The breach detection analyzer 410 is operable to manage the platform logic associated with retrieving log files from various client networks, collecting data pertaining to the plurality of network entities, normalizing log records into a standard format and storing the normalized data into at least one entity record of the system's data repository. The analyzer 410 is further operable to building the learning process, performing analysis, determining the entity score associated with the network entities and generating output of the classified risk factor, accordingly.

The logic engine 420 is operable to manage the platform logic associated with retrieving log files from the various client networks and communicate with the machine learning engine. The logic engine 420 is operable to receive various communications of legitimate or malicious activities from various sources, such as internal employees (421) of a business unit via gateways and active directory, remote employees (422) via SSL VPN, Contractors (423) and Partners (424) via Web Access Portal and Customers (425) via mobile applications and browsers. The logic engine 420 is further operable to receive inputs of a user behavior profile (426), device profile (427) and community input (428).

The machine learning engine 430 may include a supervised machine learning model logic 432, a supervised machine tuner 434. The machine learning logic 432 may include internally a machine learning classifier operable to perform entity network classification, to determine the risk factor associated with at least one entity specifying if it is malicious or non-malicious (non-threatening) or the degree of suspect. The classification may generate an automated decision for determining the risk factor and may be associated with the entity computed score, which may for example, use further comparisons to a threshold value. Where appropriate, the classification may be determined by using additional information to generate a decision, using characteristics such as behavioral characteristics extracted from the logs or retrieval of external information associated with the suspect entity. Optionally, the machine learning classifier may use a wider range of the suspect entity features.

The machine learning logic 432 may further be operable to build knowledge that mainly correlates between assessment applied by a specific security product vendor for a single attribute or a combination of attributes. As appropriate, the knowledge as stored in the system repository may be used for associating scores to new network entities. Further, the knowledge for each vendor may be represented differently, affecting the resulting analysis. It is noted that standard learning algorithms may be applied such as Random Forests, Support Vectors Machine (SVM) and naive Bayes classifiers.

The machine learning tuner 434 may be operable to provide manual and automatic tools to continuously extract new attack behavioral profiles update with new machine-learning feature. The machine tuner 434 may be operable to provide patterns to enable the classification of an entity being malicious or belonging to a non-threatening set.

The machine learning tuner 434 may further be operable to manage communication attacks and provide defensive means to client networks that may possibly be affected from such communication attack detected in another client network. The machine learning tuner 434 may be configured to manage an associated attack profile database, adding attack new characteristics to the database. For example, a detected command and control host identified, in one business unit, may be added and stored in the profile database as part of a host blacklist. Thus, the profile database information may be applied to block communication to any of the blacklisted hosts in another client network. Furthermore, say for example, attacks are detected in business units A, B and C based upon log analytics and stored in the profile database. Accordingly, statistical indicators may be derived from the aggregated data, to help preventing malicious activities in business unit D.

Additionally or alternatively, the machine learning tuner 434 may include a manual review of professional experts examining/researching a suspect entity upon certain conditions to determine its associated classification.

It is noted that the log analytics system's repository may be a storage unit comprising a plurality of databases such as classification database, categorization database, profile database and more, provided to store the information collected by the log-analytics detection platform 410. The storage unit may be used to store data in various forms, filtered or unfiltered. Data forms may be records of network entities, vendor specific assessments, customer specific information, classification of suspicious server machines, classified raw traffic, bot-traffic patterns indicative of bot-infected assets, classified traffic, filtered traffic or the like. For example, traffic may be classified in accordance with 'client addresses' representing corporate assets to be protected, 'bot addresses' representing criminal servers, known bots, traffic dates, or any other classification scheme optionally defined by a user.

It is noted that the system may be operable of employing unlimited repository storage, thus the system may be configured to analyze the plurality of client networks' data log information in massive parallel processing batches several times a day. Accordingly, the system may be operable to track down hidden security events such as stealthy and targeted malware attacks existing for long durations.

Channels & Super-Channels

Figure 5A:
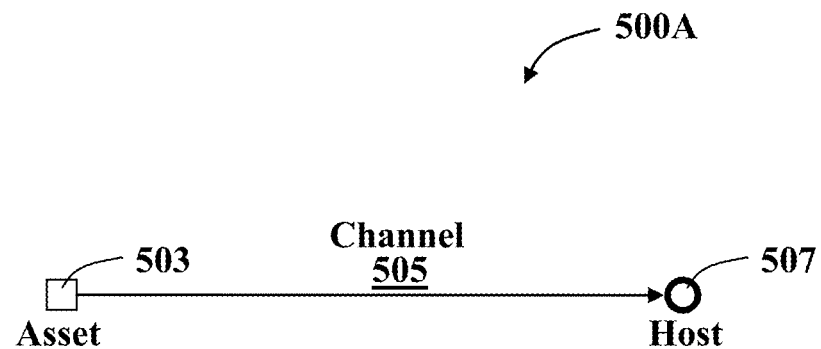

Reference is now made to FIG. 5A, there is provided a block diagram representation illustrating a communication channel, which is generally indicated at 500A, associated with an organizational asset and a host. The block diagram representation 500A includes a channel 505 showing the outbound communication between a client asset 503 representing a communication source within an organization and a host 507 representing a communication target.

In general, a host may be referred to as a computer or other communication device providing data or services that a remote computer can access by means of a network or a modem. Specifically, with regard to the presently disclosed subject matter, a host may be a computer that is connected to a TCP/IP network such as the Internet outside an organizational framework.

It is noted that a channel may be used to capture different communication behaviors between an asset (the source) and a host (the target) for a short time duration (seconds, minutes). Additionally, the outbound communication of a channel may be tracked for long time durations (days, weeks and more). Tracking outbound communication of a channel for a longer time durations may be essential as malware may try to maintain persistent communication channels with C&Cs hosts.

Figure 5B:
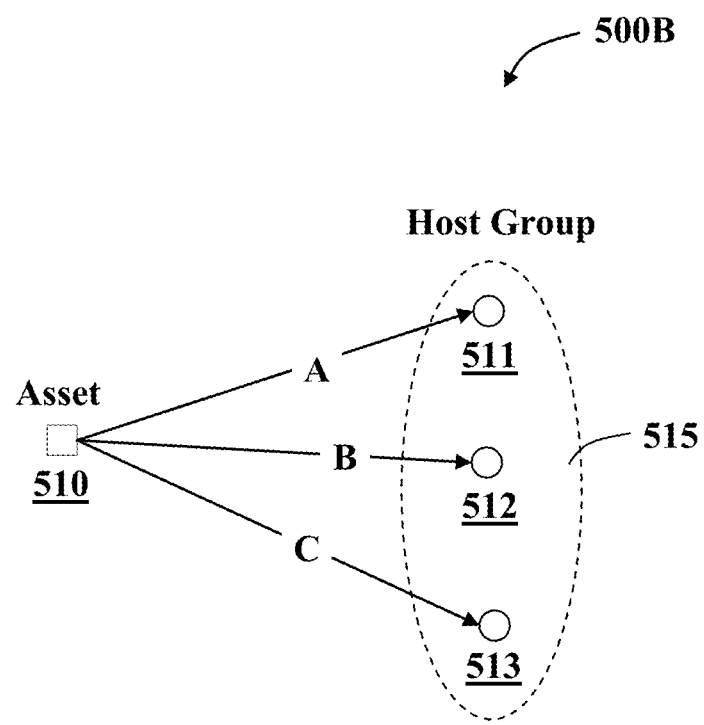

Reference is now made to FIG. 5B, there is provided a block diagram representation illustrating a super-channel, which is generally indicated at 500B, the super-channel is associated with outbound communication between an organizational asset and a plurality of similar hosts during a time duration. The block diagram representation 500B shows a super channel that includes three channels "A", "B" and "C" each associated with outbound communication between a channel and a host. The block diagram representation 500B includes an asset 510 and a host group 515 comprising a first host 511; a second host 512; and a third host 513. The first channel indicated by "A" represents a channel of outbound communication between the asset 510 and the host 511. The second channel indicated by "B" represents a channel of outbound communication between the asset 510 and the second host 512, and the third channel indicated by "C" represents a channel of outbound communication between the asset 510 and the host 513.

Many of the malware use a dynamic set of hosts for their C&Cs, and the persistent communication channel is with a set of C&Cs rather than a single C&C. The usage of dynamic set of hosts as C&Cs assist malwares in avoiding detection and improving survivability. Malwares commonly use a C&C host for a short time duration and when one C&C is detected and blocked a replacement host is mostly at reach. Furthermore, the different C&C hosts used by a malware typically have some common characteristics, and the communications to these C&Cs from an infected asset may have some common patterns or attributes. Thus, using the channel and super-channel method and identifying these similarities makes channel and super-channel an essential tool against such malware attacks.

Figure 5C:
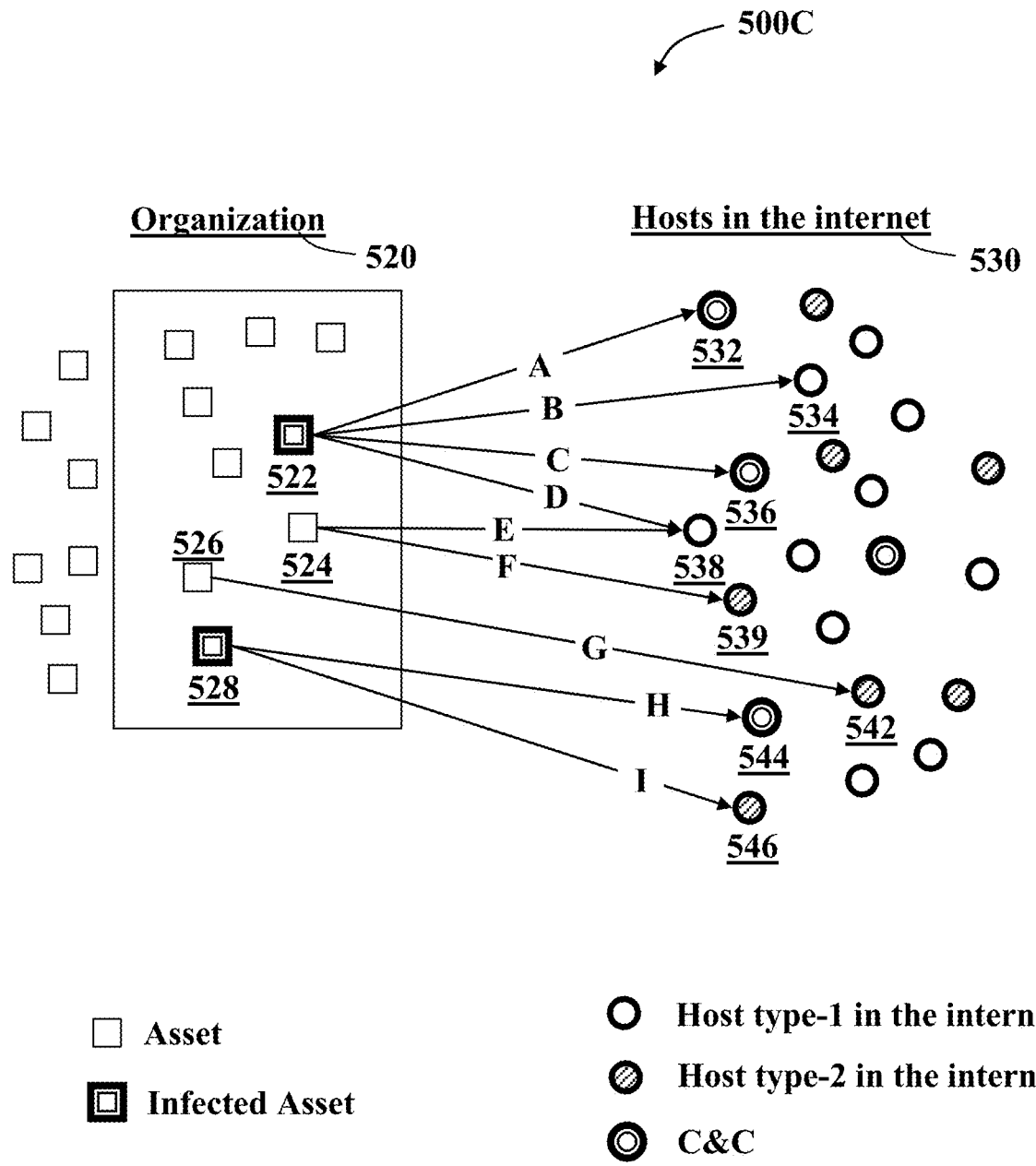

Reference is now made to FIG. 5C, there is provided a block diagram of various channels and super-channel configurations, which is generally indicated at 500C, the block diagram illustrating an organizational deployment of assets communicating with hosts located variously in the Internet.

The block diagram illustration 500C includes a first super-channel comprised of four channels "A", "B", "C" and "D", where an infected asset 522 is communicating with a first C&C host 532 (channel "A"), a first host 534 (channel "B"), a second C&C host 536 (channel "C") and a second C&C host (channel "D"); a second super-channel comprised of two channels "E" and "F", where an asset 524 is communicating with a host 538 (channel "E") and a second host 539 (channel "F"); a channel "G" with an asset 526 communicating with host 542; and a third super-channel comprised of two channels "H" and "I", where an asset 528 is communicating with a host 544 (infected, channel "E") and a second host 546 (channel "I").

It is noted that the channels "A", "B", "C" and "D" represent outbound communication between an asset 522 associated with an organization 520 to a host group comprising hosts and C&C hosts. The group of these channels is referred to as a super-channel.

It is further noted that as the host group includes at least one C&C host, the asset 522 is referred to as an infected asset. Similar analysis may be associated to asset 528 with outbound communication to a C&C host 544.

Merging of Host Groups

Host groups may be merged based upon similarity, in which the similarity may be checked between super-channels of two compared host groups. The similarity may be checked by examining proximity of characteristics vectors of the individual channels of which the super-channel is composed of. Accordingly, the characteristics in the characteristics vector of a channel may relate to communication behavior, the domain or the IP of the target host.

The communication characteristics may relate to the path and query parts of the URL, the destination IP address, sequence properties, and more. The domain or IP characteristics may be associated with the domain and subdomain of the host, the domain registration details, IPs of the domain, the domain site, and more.

When a similarity between super-channels is discovered and is found as strong enough, the host groups of the similar supper channels are merged to include a union of the hosts in the host groups. In particular, the similarity check may be constrained to be between a host group that does not contain C&C hosts and a host group that contains C&C hosts. Upon merge of such host groups all hosts in the merged host group may be marked under certain constraints as C&C hosts.

It is noted that super-channels in this case may be related to communication entries in logs files of different sources. Optionally, the source log files may include different customers, different organization, a sandbox environment, and the like.

Figure 6A:
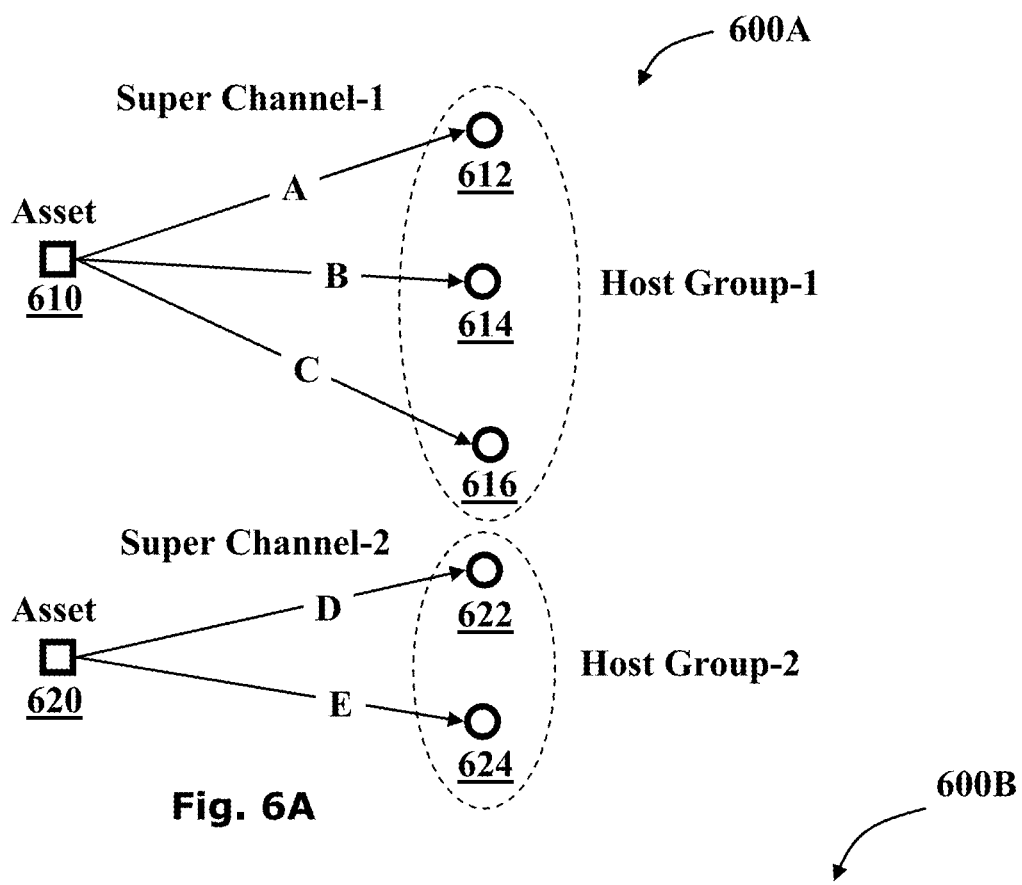

As illustrated in FIG. 6A, there is provided a block diagram 600A of two super channels. The first super-channel indicated as super-channel-1 comprising an asset 610 in communication with host 612 making channel "A", host 614 making channel "B" and host 616 making channel "C", where hosts 612, 614 and 616 are making host group-1. The second super-channel indicated as super-channel-2 comprising an asset 620 in communication with host 622 making channel "D" and host 624 making channel "E", where hosts 622 and 624 are making host group-2.

Figure 6B:
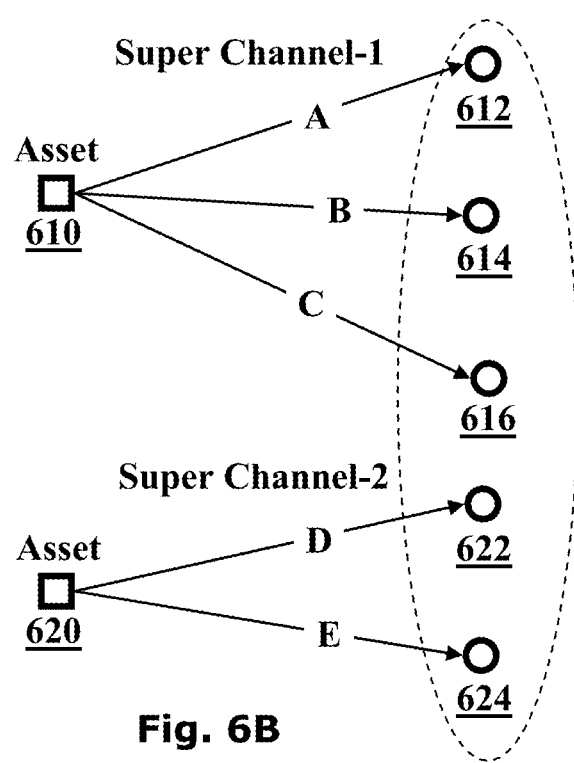

As further illustrated in FIG. 6B, there is provided a block diagram 600B of the merged host groups into one host group based upon similarities of characteristics.

The Scoring Model & Super-Channels

It is noted that the logic engine of the log-analytics detection platform is configured to determine classification based upon assigning a computed score to an entity. The score computation may be performed using a supervised machine learning algorithm configured to build a scoring model based on previous entity computations and examples, each of which is associated with a set of features and classification. For example, an entity is referred to as malicious if the scoring result is high enough. The entity may be referred to as highly suspect when the score is somewhat lower, and legitimate for a low computed score. The scoring model may apply supervised machine learning algorithms such as Random Forests, Support Vectors Machine (SVM), naive Bayes classifiers and the like. The classification may be determined based upon the computed scoring and a classification may be assigned to determine the associated risk factor (malicious, legitimate and values within this range).

Channel (Asset-Host) Log Analytics

Reference is now made to the flowchart of FIG. 7A, there is provided a method for identifying communications to C&Cs machines, which is generally indicated at 700A, the method 700A representing the main steps for log analytics based on channel computation and aggregation, and on machine learning score computation to detect possible malicious client network attacks. The method 700A may use log input information from a server log file associated with a client network and categorization/classification definitions stored in a repository. The method 700A may read a plurality of assessment attributes, stored as log records of at least one log file.

Commonly, a log file may be associated with a security product installed on a server, a gateway or a proxy machine. The log file may further be associated with a client network (such as described in FIG. 2).

Optionally, if additional internal/external sources are available, the method may use such information possibly associated with other client networks, various security product vendors, organization market verticals (finance, health, transportation etc.) and the like.

It is noted that, as illustrated hereinafter, the method 700A may be configured to execute appropriate software installed on one of its constituent server devices.

According to the method 700A, the process of log based malware detection analytics is associated with channel entities, and may include obtaining outbound communications log files from various sources—step 710, of a server, a gateway or a proxy machine, where each log file may include log records associated with at least one client-asset. Optionally, a log file may be associated with at least one asset machine executing security product(s) of various vendors. Additionally, it is noted that the log files may be obtained from several client networks associated with a client organization or with various customer organizations. Furthermore, the outbound communication logs may be http or https communications recorded by various server machines, gateways, proxies or other organizational devices.

It is further noted that a log file may represent a specific time duration such as logs of the last hour, last day, last week and the like.

Variously, the associated log data files may be structured in several third-party formats (TPF). Accordingly, the categorized fields of a TPF log record may be normalized by mapping existing TPF log record fields—step 712 (optional step) into a common format having a unified structure. The analytics process may further include extracting channel associated features for a time duration—step 714; features are extracted for the asset (the source of communication), the host (the target of communication) and for the channel itself.

As appropriate, asset features may include, for example, references to the amount and type of the communication, working hours and the like.

As appropriate, the host(s) being communicated with by the specific asset are identified and the associated features may be collected and computed, such as the popularity of the domain (based on external sources), domain registration information and the like.

Accordingly, channels features (channel attributes) may be collected by grouping the communication records from the various log files according to a channel associated with the pair of an asset and a host. Accordingly, channel features may include:
  The communication behavior, for example:
    The time period and frequency in which the channel is active for long durations (days, weeks, months)
    Statistics on values of http fields. e.g., method, requested and received bytes, user agent.
    Anomalies in relation to other channels characteristics of the asset in the same time period or in previous time periods
  The domain or IP of hosts in the host group, for example:
    Time since registration of the domains
    Known reputation of the domains or IPs based on various sources
    Properties of the domain site As appropriate, the channel log based detection analytics method 700A further includes aggregating associated channel features over a time duration—step 716, combining current computed feature values of a channel with historic computed feature values for a matched channel, identified by a pair of asset and host.

As illustrated in FIG. 7B, there is provided description of step 716 of aggregating channel features, comprising retrieval of historically aggregated channel information—step 716.1, optionally from a system media storage or a system repository; updating the aggregated historical information with up-to-date associated feature data, using functions of average, weighted average, minimum, maximum, list concatenation and the like—step 716.2; computing an associated feature set (attributes) for at least one entity associated with the channel—step 716.3; and storing the aggregated feature set (updated) of the channel or associated entities, in a system storage media or a system repository—step 716.4.

As appropriate, computing an associated feature set for each entity associated with the channel, wherein the associated entity refers to the channel, the client-asset associated with the channel and the host.

It is noted that for a channel as the entity, the feature set was already computed as stated in previous step 716. With reference to the host as the entity associated with the channel, the feature set of the channels associated with each host is aggregated into the host features. Furthermore, the aggregation may be performed by grouping the channels that have the same host. Additionally, for each host, the channel's features set of the host group may be aggregated to corresponding host features using functions of average, max and the like. For the case of the entity is the asset associated with the channel, features associated with other channels of the asset may be aggregated to create corresponding asset features set, using functions of average, max and the like considering all the channels of the asset or subsets, matching certain criteria.

As appropriate, the channel log based detection analytics method 700A further includes generating a score to entities related to the channels and determining the risk factor according to the entity score—step 718, wherein the score of entity expresses the suspect level that the entity is involved with a C&C communication. Further, the risk factor specify if the entity is malicious (threatening), non-malicious (non-threatening) or suspicious. Thus, if the host of a channel related to the entity is known to be a C&C host, then the risk factor may be set to high.

Optionally, the risk factor may be stored in the entity classification repository.

Additionally or alternatively, in various cases, the score computation may be performed using a supervised machine learning algorithm configured to build a scoring model based on previous entity examples, each of which is associated with a set of features and a classification as malicious (threatening) or non-malicious (legitimate, non-threatening), and then using the model to determine the score of new entities.

It is noted that a classification may be associated with an entity based on the computed score. For example, an entity may be referred to as malicious, if the score result is high enough, highly suspected when the score is somewhat lower, and legitimate for a low score. As illustrated in FIG. 7C, there is provided description of step 718 of generating a risk factor for a suspected entity, based upon the computed score associate with the entity. The step 718 includes generating an entity scoring model based on past history—step 718.1, using previously stored channel related entities data;

It is noted that the step 718.1 of generating an entity scoring model, is optionally performed in this flow. Commonly, the entity scoring model is generated a-synchronically, at a time in which existing data indicates such a need.

The step 718 further comprising computing the score of associated entities using the entity scoring model—step 718.2; validating the associated classification—step 718.3, where the validation may include a manual process or an automated process which uses additional data sources or computation methods for performing the validation of entities classified as malicious or highly suspected. Additionally, the entities and associated classifications and features may be saved to system storage or historical data repository, and then may be used as examples for building the scoring model; generating a score to each channel related entity—step 718.4; and determining the risk factor classification—step 718.5.

As appropriate, the channel log-analytics detection method 700A further includes the step of reporting incidents—step 720 (optional step), configured to reporting assets as infected or highly suspected of being infected. An asset may be reported to be infected or highly suspected, if the risk factor of an associated entity, as determined by the score result, is higher than a pre-configured threshold. Additionally or alternatively, if the entity was classified as malicious or highly suspected as malicious, a report may be transmitted.

The report or associated alert may be generated based upon the entity score or classification. Optionally, the report or the associated alert may be transmitted, based upon current configuration, via the communication network. It is noted that the entity associated with the client-asset, may be the client-asset itself, a channel in which the client-asset appears or a host that appears in a channel associated with the client-asset.

It is further noted that the report may include details on communication related to the asset suspected as malicious and reason for the analysis. The reporting of incidents may be performed using a portal which presents incidents, API (application program interface), through dedicated connectors into different SIEMs (Security Information and Event Management), dedicated splunk Application, messages, documents, or other methods.

It is further noted that the synthesis of at least a plurality of third-party assessment attributes, optionally with other internal/external sources may enable detection of malware attacks that could not be detected using information of a single business unit or a customer, nor if associated with a single security product. Furthermore, the synthesis may enable detection of low profile attacks based upon aggregating evidence from multiple sources over time.

Super-Channels Log Analytics

As detailed hereinabove (FIG. 5B), a super-channel is a pair of at least one asset and a group of hosts, representing the communication between the asset and the hosts within the group. Hosts are considered as related, if they seem to be part of the same service which may be legitimate or malicious such as C&Cs of some malware and the like.

Reference is now made to the flowchart of FIG. 8A, there is provided a method for identifying communications to C&Cs machines, which is generally indicated at 800A, the method 800A representing the main steps for log-analytics based on super-channel computation and aggregation using machine learning score computation to detect possible malicious client network attacks. The method 800A may use log input information from a server log file associated with a client network and categorization/classification definitions stored in a system repository. The method 800A may read a plurality of assessment attributes, stored as log records of at least one log file.

Commonly, a log file may be associated with a security product installed on a server, a gateway or a proxy machine. The log file may further be associated with a client network (such as described in FIG. 2).

Optionally, if additional internal/external sources are available, the method may use such information possibly associated with other client networks, various security product vendors, organization market verticals (finance, health, transportation etc.) and the like.

It is noted that, as illustrated hereinafter, the method 800A may be configured to execute appropriate software installed on one of its constituent server devices.

According to the method 800A, the super-channel log based detection analysis includes obtaining of outbound communications log files from various sources—step 810, associated with a server, a gateway or a proxy machine, where each log file may include log records associated with at least one client-asset. Optionally, a log file may be associated with at least one asset machine executing security product(s) of various vendors. Additionally, it is noted that the log files may be obtained from several client networks associated with a client organization or with various customer organizations. Furthermore, the outbound communication logs may be http or https communications, recorded by various server machines, gateways, proxies or other organizational devices. It is further noted that a log file may represent a specific time duration such as logs of the last hour, last day, last week and the like.

Variously, the associated log data files may be structured in several third-party formats (TPF). Accordingly, the categorized fields of a TPF log record may be normalized by mapping existing TPF log record fields—step 812 into a common format having a unified structure. The super-channel log analytics may further include extracting super-channel associated features for a time duration—step 814, where features may be extracted for the client-asset of the associated channel (the communication source), the host of the associated channel (the communication target) and for the identified channel itself.

As appropriate, client-asset(s) features may include, for example, references to the amount and type of the communication, working hours and the like.

As appropriate, the host(s) in communication with the specific client-asset(s) are identified and the associated features may be collected and computed, such as the popularity of the domain (based on external sources), domain registration information and the like.

As appropriate, the super-channel log based detection method 800A further includes identifying the super-channels—step 816, performed by various ways, for example:

Grouping the communication records according to channels, where a channel is a pair of an asset (the communication source) and an host (the communication target)

Searching within the channels associated with the same asset channels, having similar characteristics and building from them the super-channels. This is done by:

Extracting vector of characteristics for each channel of an asset, where the characteristics can relate to communication and/or to the domain or IP of the target host. For example, The communication characteristics may relate to the path and query parts of the URL, the destination IP address, sequence properties, and more.

The domain or IP characteristics, might relate to the domain and subdomain of the host, the domain registration details, IPs of the domain, the domain site, and more.

Grouping the channels that their characteristics vectors are close enough into a super-channel, where:

The grouping could be performed based on identity or similarity in certain characteristics or based on similarity between the combinations of characteristics.

The supper-channel asset is set to the asset of the channels, and the super-channel host group is set to consist of the hosts of the channels that were grouped.

Every channel that is not grouped creates a trivial super-channel in which the group of hosts include a single host (the host of the channel)

As appropriate, the super-channel log based detection method 800A further includes extracting a set of features for each super-channel—step 818, for a specific time duration, performed variously, for example:

Using identified similarity, such as the host group size; the type of similarities that were found when creating the super-channel Using communication behavior, such as:

Time intervals between communications to the same host or different hosts in the hosts group The time period and frequency in which the super-channel is active (along long time period of days, weeks, or months)

Statistics on values of http fields. e.g., Method, Requested and Received bytes, User Agent.

Anomalies in relation to other super-channels characteristics of the asset within the same time duration or in previous time duration Using the domain or IP of hosts in the host group, such as:
Time since registration of the domains
Known reputation of the domains or IPs based on various sources
Properties of the domain site It is noted that a time duration is associated with a specific starting time.

As appropriate, the super-channel log based detection method 800A further includes aggregating super-channel and super-channel features—step 820 over a time duration, combining current computed feature values of a super-channel with historic computed feature values for a matched channel.

As illustrated in FIG. 8B, there is provided description of above step 820 of aggregating super-channel and super-channel features, comprises identifying of super-channel from previous periods that corresponds to a super-channel from a recent period, where the matching requires: same asset, and at least one common host in the host groups, or similarity in characteristics of the involved—step 820.1; updating the host group of the aggregated super-channel to include the hosts of the recent-super channel and the corresponding super-channel—step 820.2; updating the feature values of the aggregated super-channel to be a combination of the values of the recent super-channel and the retrieved super-channel—step 820.3; and storing the aggregated feature set (updated) of the super-channel in a system storage media or a system repository—step 820.4.

As appropriate, the super-channel log based detection method 800A further includes computing features to an entity related to the super-channel—step 822, where:

The entity related to a super-channel might be the super-channel itself, the host group of the super-channel, individual hosts of the host group of the super-channel, or the asset of the super-channel When the entity related to the super-channel is the host group, the features of the super-channels of the host group are aggregated to host group features. The aggregation is performed by:

Grouping the super-channels that have the same host group or that their host groups share common hosts. In the case of host groups that share common hosts, an extended host group which includes the union of the hosts of the two host groups is generated instead of the original host groups.

For each host group, the feature values of super-channels of the host group are aggregated to corresponding host group features, where functions like average, and max are used in that aggregation When the entity related to the super channel is individual host of the host group, the host group features are associated with the hosts of the group When the entity related to the super-channel is the asset, features from different super-channels of the asset are aggregated to create corresponding asset features. Function like average and max can be used for that aggregation, considering all the super-channels of the asset or subsets which match certain criteria.

Optionally, the super-channel log based detection method 800A may further include merging two host groups based upon similarity between the super-channels of the host groups—step 824, where:

The similarity can be checked by examining proximity of characteristics vectors of the individual channels which composed the super-channels When a similarity between super-channels is discovered and is found as strong enough, the host groups of the similar supper-channels are merged to include a union of the hosts in the host groups Updating the super-channels to relate to the merged host-group. Accordingly, the involved super-channels are updated to relate to the merged hot-group.

In particular, the similarity check can be constrained to be between a host group that does not contain C&C hosts and a host group that contains C&C hosts. Upon merge of such host groups all hosts in the merged host group may be marked as C&C hosts.

As appropriate, the super-channel log based detection method 800A further includes generating a score to each entity related to a super-channel and further determine the associated risk factor—step 826, where:

It is noted that the score of an entity expresses the suspect level that the entity is involved with C&C communication. Furthermore, the score computation may be performed by a supervised machine learning algorithm, as described in the machine learning section, hereinabove.

As illustrated in FIG. 8C, there is provided description of step 826 of generating a score to entities related to a super-channel and determining the associated risk factor. The step 826 includes computing the entity score result as described hereinabove, and as appropriate validating the associated computed score—step 826.1, where the validation may include a manual process or an automated process which uses additional data sources or computation methods for performing the validation of entities classified as malicious or highly suspected. Additionally, the entities and associated classifications and features may be saved to system storage or historical data repository, and then may be used as examples for building the scoring model. The step 826 further includes generating the scoring model based on past history of previous entity examples, each of which is associated with a set of features and a classification as malicious or legitimate—step 826.2. Then, using the scoring model to determine the score of new entities, thus retrieving entity associated data from the scoring model—step 826.3, performing steps 826 through 826.3 repeatedly, and computing the entity score and accordingly, determining the risk factor of the entity—step 826.4.

It is noted that the scoring model may be generated a-synchronically, not necessarily part of the analysis flow. The scoring model may be operable to collect a plurality of entities, store associated data, analyze associated entity properties and execute a supervised machine learning algorithm to determine an associated entity score for each new entity collected into the model.

As appropriate, the log based detection method 800A further includes the step of reporting incidents—step 828, configured to reporting assets as infected or highly suspected of being infected. An asset is reported to be infected or highly suspected, if the risk factor of an entity related to the asset is scored above a pre-configured threshold.

Additionally or alternatively, an asset is reported as infected or highly suspected as infected if the entity was classified as malicious or highly suspected as malicious. It is noted that the entities that may be considered related to an asset, are the asset itself, a super-channel in which the asset appears, a host group that appears in a super-channel of the asset, or a host of a host group that appears in a super-channel of the asset.

It is noted that the report may include details on communications related to the suspected asset and reason for the suspect. Furthermore, reporting of an incident may be performed via a web portal, using an API (application program interface), using of messages, documents, or other associated methods.

The methods and systems described hereinabove may be deployed in part or in whole through a machine or device that executes computer software, program codes, and/or instructions on a processor. The processor may be part of a server, client, network infrastructure, mobile computing platform, stationary computing platform, or other computing platform. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

The methods and systems described herein may be deployed in part or in whole through a machine that executes computer software on a server, client, firewall, gateway, hub, router, or other such computer and/or networking hardware.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The scope of the disclosed embodiments may be defined by the appended claims and includes both combinations and sub combinations of the various features described hereinabove as well as variations and modifications thereof, which would occur to persons skilled in the art upon reading the foregoing description.

Technical and scientific terms used herein should have the same meaning as commonly understood by one of ordinary skill in the art to which the disclosure pertains. Nevertheless, it is expected that during the life of a patent maturing from this application many relevant systems and methods will be developed.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. A method for detecting security threats associated with at least one client network, the method for use in a system, said system comprising:
    at least one network entity associated with said at least one client network and configured to enable outbound communication via a communication network;
    at least one asset configured to communicate with one of a plurality of hosts via said communication network;
    and at least one log-analytic detection platform configured to analyze a plurality of log files associated with a plurality of channels, each said plurality of channels connecting an asset with a host, and further configured to determine a risk factor at least based on said outbound communications log for at least one entity, each of said plurality of channels being characterized by a channel identification pair comprising said asset and said host, said method for operating said at least one log-analytics detection platform comprising:
        obtaining, via said communication network, said plurality of log files from said at least one client network, each of said plurality of log files comprising at least one log record associated with at least one channel, said plurality of log files including at least one outbound communications log;
        extracting a channel feature set for each of said plurality of channels from said plurality of log files, said channel feature set comprises data pertaining to at least one associated entity, at least one channel feature being behavior of communication over a channel;
        aggregating said channel associated features for each of said plurality of channels into at least one data repository;
        generating said risk factor for said least one entity associated with entities of said plurality of channels, said risk factor characterized by an entity score; and
        blocking of communication for said at least one entity when said risk factor is indicative of said at least one entity being a security threat;
    wherein the step of aggregating, comprises:
        retrieving, from said at least one data repository, a stored channel and an associated stored channel feature set identified by said channel identification pair;
        joining the channel feature set with the stored channel feature set matched by said entity identification pair;
        computing features for at least one entity associated with the stored channel; and
        storing the joined channel feature set into said at least one data repository; and
    wherein the step of computing further comprises:
        grouping a set of channels matched by the associated host; and
        computing the features of the associated host by joining the feature associated with each channel which is associated with the host.

2. The method of claim 1, wherein the step of obtaining further comprises:
normalizing each of said plurality of log files by mapping fields associated with said at least one log record from a third-party format into a standard format.

3. The method of claim 1, wherein the step of extracting, comprises:
matching at least one log record associated with at least one of said plurality of channels;
grouping said at least one log record into a set of groups of channel associated records for at least one of said plurality of channels, each group of said set is associated with one matched channel;
extracting said channel feature set from the group of channel associated records associated with each of said plurality of channels and identified by said channel identification pair, wherein said channel feature set being characterized by at least one of:
data pertaining to communication behavior, data pertaining to host domain and data pertaining to host IP; and
extracting, for each channel, asset associated features and host associated features and integrating into said channel feature set.

4. The method of claim 1, wherein the step of generating, comprises:
using an entity scoring model, said entity scoring model is configured to provide said entity score for said at least one entity;
classifying said at least one entity to determine said risk factor according to said entity score; and
storing pertaining data of said risk factor into said at least one data repository;
wherein the entity score expresses the likelihood that said at least one entity is associated with a command and control (C&C) host communication.

5. The method of claim 4, wherein said at least one log-analytic detection platform is configured to collect a plurality of classified entities and execute a supervised machine learning algorithm to determine said entity scoring model, wherein said plurality of classified entities are selected from a group consisting of a channel, an asset, a host and combinations thereof.

6. The method of claim 4, further comprising validating said risk factor associated with said at least one entity.

7. The method of claim 4, wherein the step of generating further comprises:
creating an output list of potentially compromised client assets, if said risk factor indicates that said at least one entity is malicious, said output list comprising each of said plurality of assets communicating with said at least one entity.

8. The method of claim 1, further comprising:
creating an output incidents report comprising data pertaining to the risk factor associated with each of said plurality of channels related entities.

9. The method of claim 8, wherein said output incidents report is configured to be transmitted via said communication network to said at least one client network.

10. The method of claim 1, further comprising the step of:
creating an alert associated with a detectable security incident associated with at least one entity, said alert is configured to be transmitted via said communication network.

11. A method for detecting security threats associated with at least one client network, the method for use in a system, said system comprising:

at least one network entity associated with said at least one client network and configured to enable outbound communication via a communication network;
at least one asset associated with said at least one client network and configured to communicate with at least one of a plurality of hosts via said communication network; and
at least one log-analytic detection platform configured to analyze a plurality of log files, said plurality of log files including at least one outbound communications log, and further determine a risk factor that is based at least on said outbound communications log and is associated with at least one super-channel, said at least one super-channel is characterized by a super-channel feature set, at least one super-channel feature being behavior of communication over a super-channel, said at least one super-channel comprises:
a set of channels, each said channel connecting an asset with a host, wherein said at least one host associated with a host-group, and wherein each said channel being characterized by a characteristics vector and a channel identification pair, said method for operating said at least one log-analytics detection platform comprising:
obtaining said plurality of log files from said at least one client network, each of said plurality of log files comprising a plurality of communication records;
identifying said at least one super-channel, wherein the set of channels associated with said at least one super-channel are determined by a shared similarity;
extracting the super-channel feature set for said at least one super-channel;
aggregating the super-channel feature set for said at least one super-channel into at least one data repository;
generating said risk factor for said at least one entity associated with entities of said at least one super-channel, said risk factor characterized by an entity score; and
blocking of communication for said at least one entity when said risk factor is indicative of said at least one entity being a security threat;
wherein the step of aggregating, comprises:
retrieving, from said at least one data repository, a stored super-channel and an associated stored super-channel feature set matching at least one of said set of channels associated with said at least one super-channel, wherein said matching comprises an identical asset and a common host or a similarity in characteristics of the associated channels;
joining the host-group associated with the at least one super-channel into the host-group associated with the stored super-channel;
joining the super-channel feature set associated with the at least one super-channel into the stored super-channel feature set; computing features for at least one entity associated with the stored super-channel; and
storing the joined super-channel feature set for the stored super-channel of into said at least one data repository;
wherein the step of computing, comprises:
joining host-groups having at least one common host and updating the associated channels to relate to the joined host-group;
grouping a set of super-channels associated with the same host-group; and
computing the associated features of the host-group by joining the feature values associated with each super-channel associated with the host-group;

wherein the step of computing, comprises:
joining host-groups having at least one common host and updating the associated channels to relate to the joined host-group; grouping a set of super-channels associated with the same host-group; and computing the associated features of the host-group by joining the feature values associated with each super-channel associated with the host-group.

12. The method of claim 11, wherein the step of identifying, comprises:
identifying a set of channels having the same asset and a shared similarity into a super-channel;
setting the asset of the supper-channel to be the asset of each channel having said common characteristics and setting the host-group of the super-channel to include the hosts of the associated channels; and
creating a new super-channel for each channel that is not grouped, where the associated host-group comprises the host of the associated channel, wherein said shared similarity is based on identity or similarity in certain characteristics or based on similarity between a combination of characteristics of the associated characteristics vector.

13. The method of claim 11, wherein the step of extracting, comprises:
extracting a set of attributes representing the associated super-channel feature set, said super-channel feature set characterized by at least one of:
an identified similarity characteristics determined by said shared similarity associated with each channel of said set of channels, a communication behavior characteristics associated with at least one channel of said set of channels, a domain characteristics of at least one host of the associated host-group; and
a host IP address characteristics of at least one host of the associated host-group.

14. The method of claim 11, wherein said characteristics vector comprises data pertaining to at least one characteristic selected from a group consisting of:
communication characteristics, domain name characteristics, IP address characteristics and combinations thereof, wherein said communication characteristics comprises data associated with at least one of the path and query parts of a URL, destination IP address, sequence properties; and
wherein said domain name characteristics and IP address characteristics comprises data associated with at least one of the domain and subdomain of the host, the domain registration details, IP addresses of the domain and the domain site.

15. The method of claim 11, wherein further comprising the step of merging associated host-groups based upon similarities, comprising:
determining the shared similarity of a first super-channel with a second super-channel; and
merging the associated host-group of the second super-channel into the associated host-group of the first super-channel, if the characteristic vector of said first super-channel is analyzed of being similar to the characteristic vector of said second super-channel.

16. The method of claim 15, wherein step of merging, comprises:
determining the shared similarity of a first super-channel with a second super-channel such that the associated host-group comprises at least one C&C host; and
merging the associated host-group of the second super-channel into the associated host-group of the first super-channel, if the first host-group comprises no C&C hosts and the second host-group comprises at least one C&C host, such that all associated hosts of the merged host-group are marked as C&C hosts.

17. The method of claim 11, wherein said at least one log-analytic detection platform is configured to collect a plurality of classified entities and execute a supervised machine learning algorithm to determine said entity scoring model, wherein, each of said plurality of classified entities is selected from a group consisting of a super-channel, a host-group, a channel, an asset, a host and combinations thereof.

18. The method of claim 11, wherein the step of generating, comprises:
using an entity scoring model, said entity scoring model is configured to provide said entity score for said at least one entity;
classifying said at least one entity to determine said risk factor according to said entity score; and
storing pertaining data of said risk factor in said at least one data repository;
wherein the entity score expresses the likelihood that said at least one entity is associated in a command and control (C&C) host communication.

19. A method for detecting security threats associated with at least one client network, the method for use in a system, said system comprising:
at least one network entity associated with said at least one client network and configured to enable outbound communication via a communication network;
at least one asset configured to communicate with one of a plurality of hosts via said communication network;
and at least one log-analytic detection platform configured to analyze a plurality of log files associated with a plurality of channels, each said plurality of channels connecting an asset with a host, and further configured to determine a risk factor at least based on said outbound communications log for at least one entity, each of said plurality of channels being characterized by a channel identification pair comprising said asset and said host, said method for operating said at least one log-analytics detection platform comprising:
obtaining, via said communication network, said plurality of log files from said at least one client network, each of said plurality of log files comprising at least one log record associated with at least one channel, said plurality of log files including at least one outbound communications log;
extracting a channel feature set for each of said plurality of channels from said plurality of log files, said channel feature set comprises data pertaining to at least one associated entity, at least one channel feature being information regarding one of a domain or internet protocol (IP) address of a host;
aggregating said channel associated features for each of said plurality of channels into at least one data repository;
generating said risk factor for said least one entity associated with entities of said plurality of channels, said risk factor characterized by an entity score; and
blocking of communication for said at least one entity when said risk factor is indicative of said at least one entity being a security threat;

wherein the step of aggregating, comprises:
- retrieving, from said at least one data repository, a stored channel and an associated stored channel feature set identified by said channel identification pair;
- joining the channel feature set with the stored channel feature set matched by said entity identification pair;
- computing features for at least one entity associated with the stored channel; and
- storing the joined channel feature set into said at least one data repository; and wherein the step of computing further comprises:
- grouping a set of channels matched by the associated host; and
- computing the features of the associated host by joining the feature associated with each channel which is associated with the host.

* * * * *